United States Patent
Egawa

(10) Patent No.: US 11,585,677 B2
(45) Date of Patent: Feb. 21, 2023

(54) MAGNETIC SENSING DEVICE AND ROTATION SENSING DEVICE

(71) Applicant: Hirose Electric Co., Ltd., Kanagawa (JP)

(72) Inventor: Kosuke Egawa, Kanagawa (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 0 days.

(21) Appl. No.: 17/478,723

(22) Filed: Sep. 17, 2021

(65) Prior Publication Data

US 2022/0099462 A1    Mar. 31, 2022

(30) Foreign Application Priority Data

Sep. 28, 2020 (JP) .............................. JP2020-162330

(51) Int. Cl.
*G01D 5/20* (2006.01)
(52) U.S. Cl.
CPC ..................................... *G01D 5/20* (2013.01)
(58) Field of Classification Search
CPC ......... G01D 5/20; G01D 5/145; G01P 3/4815
See application file for complete search history.

(56) References Cited

U.S. PATENT DOCUMENTS

| 4,319,188 A | * | 3/1982 | Ito ...................... G01D 5/24404 |
| | | | 324/207.21 |
| 5,521,495 A | * | 5/1996 | Takahashi ................ G01D 5/20 |
| | | | 324/207.25 |
| 2003/0136443 A1 | * | 7/2003 | Wain .................... B60N 2/0248 |
| | | | 73/865.9 |
| 2020/0387657 A1 | * | 12/2020 | Calisch ................. G06F 30/392 |

FOREIGN PATENT DOCUMENTS

WO       2016/002437 A1    1/2016

* cited by examiner

*Primary Examiner* — Akm Zakaria
(74) *Attorney, Agent, or Firm* — Procopio, Cory, Hargreaves & Savitch LLP

(57) ABSTRACT

The magnetic sensing portion 30 of the rotation sensing device comprises three magnetic sensors 31-33 and a substrate 45 for mounting these magnetic sensors, with each magnetic sensor comprising a magnetic wire 34 generating large Barkhausen effects, a coil 35, and a bobbin 36. The magnetic sensors are disposed on the substrate 45 such that the directions of extension of the magnetic wires 34 are parallel to the substrate 45, the magnetic sensing portion 30 is disposed on the outer periphery of the trackway of the magnetic field forming portions such that the directions of extension of the magnetic wires 34 are parallel to the axial direction of the rotary shaft 3, and the location of the magnetic wire installation portion 38 in the bobbin 36 of each magnetic sensor is configured such that the respective magnetic wires 34 of the three magnetic sensors are respectively equidistant from the rotary shaft 3.

6 Claims, 8 Drawing Sheets

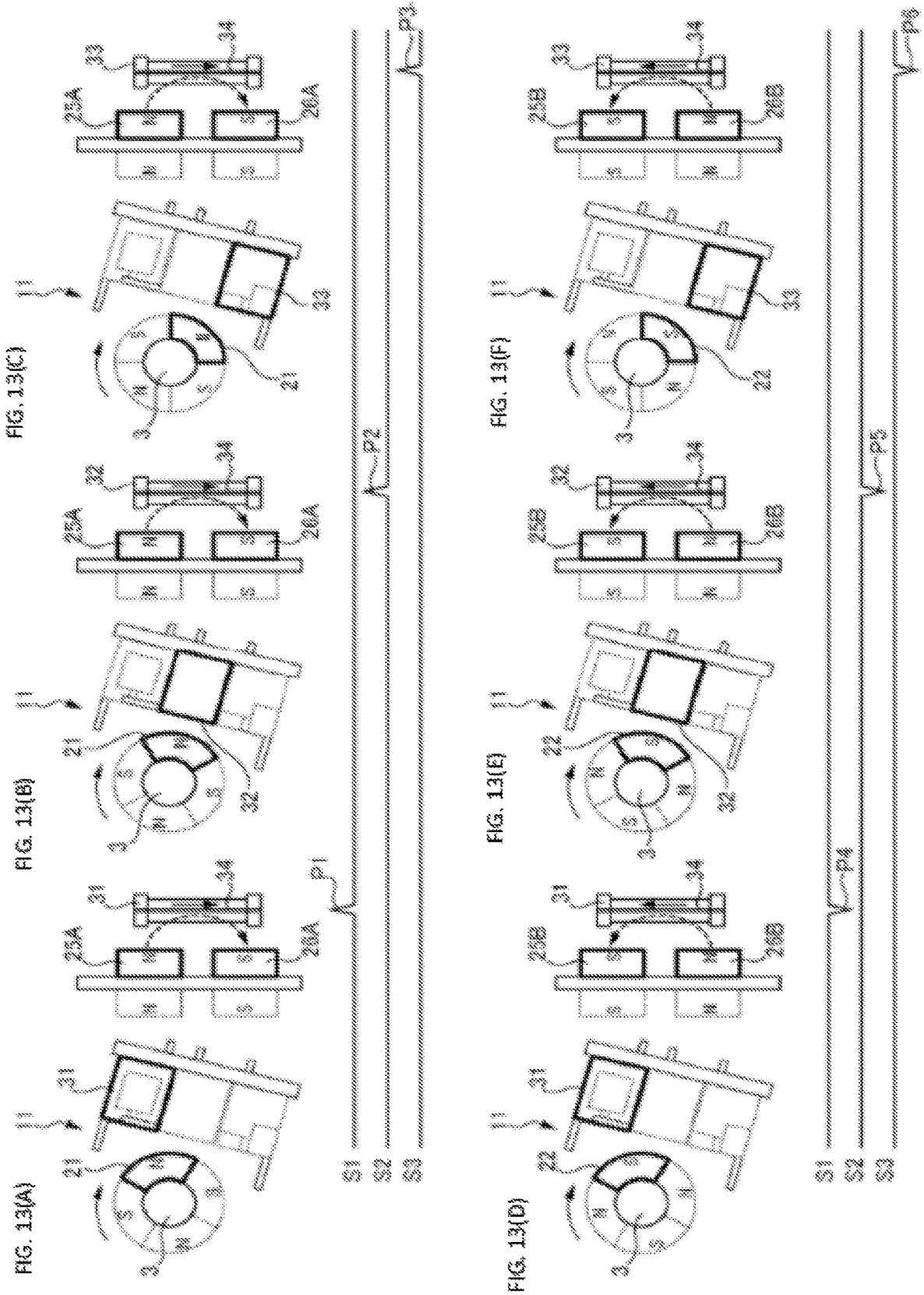

MAGNETIC SENSING DEVICE AND ROTATION SENSING DEVICE

CROSS-REFERENCE TO RELATED APPLICATIONS

This application claims priority to Japanese Patent Application No. 2020-162330, filed Sep. 28, 2020, the contents of which are incorporated herein by reference in its entirety for all purposes.

BACKGROUND

Technical Field

The present invention relates to a magnetic sensing device and a rotation sensing device for magnetically sensing the rotation of a rotary shaft in an electric motor or another rotary device.

Related Art

Well-known sensing devices for sensing the rotation of a rotary shaft in an electric motor or another rotary device include, for example, rotation sensing devices that make use of magnetic wires generating large Barkhausen effects. An example of such a rotation sensing device is provided in Patent Document 1 described below.

The rotation sensing device described in Patent Document 1, as shown in FIG. 1 and FIG. 2 of the same document, comprises four magnetic field forming portions and three magnetic sensors.

A permanent magnet is used for each magnetic field forming portion. The four magnetic field forming portions are disposed at 90-degree intervals about the periphery of a rotary shaft. In addition, the four magnetic field forming portions are disposed such that the locations of the magnetic poles of two adjacent magnetic field forming portions are opposite each other. Namely, magnetic field forming portions that form a magnetic field oriented in one direction along the axial direction of the rotary shaft and magnetic field forming portions that form a magnetic field oriented in the opposite direction along the axial direction of the rotary shaft are disposed in an alternating manner at 90-degree intervals about the periphery of the rotary shaft. Further, each magnetic field forming portion is secured to the outer perimeter of the rotary shaft and travels about the periphery of the rotary shaft along with the rotation of the rotary shaft.

On the other hand, each magnetic sensor is formed by providing a coil about the periphery of a magnetic wire that generates large Barkhausen effects. Specifically, each magnetic sensor has a cylindrical bobbin. A space extending in the axial direction of the bobbin is formed inside the bobbin, and a magnetic wire is held within this space. In addition, an electrical wire that forms a coil is wound onto the outer periphery of the intermediate portion of the bobbin. Three magnetic sensors are disposed at 120-degree intervals on the outer periphery of the trackway of the four magnetic field forming portions. Further, each magnetic sensor is disposed such that the direction of extension of the magnetic wire is parallel to the axial direction of the rotary shaft. In addition, each magnetic sensor is secured to a housing, etc., of the rotation sensing device such that it does not move along with the rotation of the rotary shaft.

When the rotary shaft rotates, the four magnetic field forming portions travel about the periphery of the rotary shaft and successively pass through the vicinity of the three magnetic sensors. Here, if we consider one magnetic sensor among the three magnetic sensors, we can see that magnetic field forming portions that form a magnetic field oriented in one direction along the axial direction of the rotary shaft and magnetic field forming portions that form a magnetic field oriented in the opposite direction along the axial direction of the rotary shaft pass through the vicinity of said one magnetic sensor in an alternating manner as the rotary shaft rotates. As a result, the direction of the magnetic field acting on the magnetic wire of said one magnetic sensor changes along with the rotation of the rotary shaft. The magnetic wire has the property of rapidly reversing its direction of magnetization, in other words, generating a large Barkhausen effect when the direction of the magnetic field acting thereon changes. In addition, when the direction of magnetization of the magnetic wire is rapidly reversed, a pulsed current is electromagnetically induced to flow through the coil. Consequently, pulse signals are output from the coil of said one magnetic sensor as the rotary shaft rotates. In accordance with the same principle, as the rotary shaft rotates, pulse signals are output from the coils of the other two magnetic sensors.

Since the four magnetic field forming portions are disposed at 90-degree intervals and the three magnetic sensors are disposed at 120-degree intervals, two or more magnetic field forming portions never pass through the vicinity of two or more magnetic sensors at the same time. Consequently, while the rotary shaft rotates, pulse signals are output from the three magnetic sensors with respectively different timing. These pulse signals allow for sensing the rotation of the rotary shaft, such as, for example, the sensing of the number of revolutions or the angle of rotation of the rotary shaft.

In addition, a rotation sensing device that makes use of magnetic wires that generate large Barkhausen effects allows for pulse signals used for sensing the rotation of a rotary shaft to be formed based on large Barkhausen effects and electromagnetic induction. Consequently, rotary shaft sensing can be accomplished without electric power.

It should be noted that in order to implement highly accurate rotation sensing with the help of a rotation sensing device that makes use of magnetic wires generating large Barkhausen effects, the number of the magnetic sensors should preferably be three or more (see Patent Document 1 above). On the other hand, the number of the magnetic field forming portions is not limited to four and may also be two. Using four magnetic field forming portions and three magnetic sensors makes it possible to sense the rotation of a rotary shaft with precision in 30-degree increments and, furthermore, using two magnetic field forming portions and three magnetic sensors makes it possible to sense the rotation of a rotary shaft with precision in 60-degree increments. It should be noted that the number of the magnetic field forming portions may be six or more. In such a case, however, it is necessary to adjust the spacing between the magnetic field forming portions and the spacing between the magnetic sensors such that two or more magnetic field forming portions would never pass through the vicinity of two or more magnetic sensors at the same time.

PATENT DOCUMENTS

[Patent Document 1]
International Publication No. 2016/002437

SUMMARY

Problems to be Solved

When the above-described rotation sensing device is assembled into an electric motor or another rotary device, each magnetic field forming portion is attached to the outer perimeter of the section of the rotary shaft that protrudes from the main body of the rotary device. In addition, each magnetic sensor is attached to the main body of the rotary device through the medium of a support member and the like, and is disposed on the outer periphery of the trackway of the magnetic field forming portions.

Incidentally, if the rotary device is small, considerable ingenuity is required in assembling the rotation sensing device into the rotary device because the space where the magnetic field forming portions and magnetic sensors are disposed becomes smaller. For example, it is desirable to reduce the size of individual magnetic field forming portions and individual magnetic sensors. It is also desirable to reduce the diameter of the trackway of the magnetic field forming portions, for example, by attaching the magnets constituting each magnetic field forming portion directly to the outer perimeter of the rotary shaft, etc. It is also desirable for each magnetic sensor to be disposed closer to the trackway of the magnetic field forming portions. It is also desirable to reduce the spacing between the magnetic sensors, for example, by disposing the magnetic sensors at 30-degree intervals, etc. Furthermore, it is desirable to make the support structure of each magnetic sensor more compact by mounting the three magnetic sensors that form part of the rotation sensing device in a space-saving manner to a single substrate.

Here, the following problems arise when the three magnetic sensors are mounted to a single substrate.

Each magnetic field forming portion is secured to the outer perimeter of the rotary shaft and travels along a circular trackway centered on the axis of the rotary shaft along with the rotation of the rotary shaft. In addition, the three magnetic sensors are disposed on the outer periphery of the circular trackway of the magnetic field forming portions such that the magnetic wires are respectively equidistant from the axis of the rotary shaft. With this structure, the magnetic fields formed by the magnetic field forming portions act on the magnetic wires of the magnetic sensors in the same manner because the circular trackway of the magnetic field forming portions is equidistant from the magnetic wires of the magnetic sensors. As a result, the timing of the pulse signals output from the coils of the magnetic sensors when the magnetic field forming portions pass through the vicinity of the magnetic sensors is made uniform for each of the magnetic sensors. Namely, with the above-described rotation sensing device in which the four magnetic field forming portions are disposed at 90-degree intervals about the periphery of the rotary shaft and the three magnetic sensors are disposed at 120-degree intervals on the outer periphery of the trackway of the four magnetic field forming portions, the timing of the pulse signals output from the three magnetic sensors as the rotary shaft rotates at a constant speed in one direction is distributed in a uniformly spaced manner. In addition, the magnetic fields formed by the magnetic field forming portions act on the magnetic wires of the magnetic sensors in the same manner, as a result of which, the wave height of the pulse signals output from the coils of the magnetic sensors is made uniform for each of the magnetic sensors. In this manner, due to the fact that the timing of the pulse signals output from the coils of the magnetic sensors when the magnetic field forming portions pass through the vicinity of the magnetic sensors is made uniform for each of the magnetic sensors and, in addition, the height of the pulse signals output from the coils of the magnetic sensors is made uniform for each of the magnetic sensors, these pulse signals can be used to increase the accuracy of signal processing intended for recognizing the rotation of the rotary shaft.

Incidentally, when three magnetic sensors are disposed side-by-side on a planar surface of a substrate with a view to mount the three magnetic sensors to one substrate, the magnetic wires forming part of the three magnetic sensors are disposed in the same plane, resulting in the problem that the magnetic wires in the three magnetic sensors cannot be made respectively equidistant from the axis of the rotary shaft.

For example, if the distance between the magnetic wire of one of the three magnetic sensors and the axis of the rotary shaft is different from the distance between the magnetic wire of another magnetic sensor and the axis of the rotary shaft as a result of mounting the three magnetic sensors to a single substrate, the timing of the pulse signals output from the coils of the magnetic sensors when the magnetic field forming portions pass through the vicinity of the magnetic sensors will differ between these two magnetic sensors or the wave height of the pulse signals output from the coils of the magnetic sensors will differ between these two magnetic sensors. If this happens, the accuracy of the above-mentioned signal processing is likely to be reduced.

The present invention was made in view of the problems described above, and it is an object of the present invention to provide a magnetic sensing device and a rotation sensing device, in which the magnetic wires in such magnetic sensors can be made respectively equidistant from the axis of the rotary shaft to increase the accuracy of signal processing intended for recognizing the rotation of the rotary shaft.

Technical Solution

It is an object of the present disclosure to make the magnetic wires in the three magnetic sensors respectively equidistant from the axis of the rotary shaft even if the magnetic sensors are mounted in a space-saving manner to a single substrate and thus increase the accuracy of signal processing intended for recognizing the rotation of the rotary shaft.

In order to eliminate the above-mentioned problems, the inventive magnetic sensing device is a magnetic sensing device that senses magnetic fields in a rotation sensing device that comprises at least two magnetic field forming portions traveling about the periphery of a rotary shaft along with the rotation of the rotary shaft while respectively forming magnetic fields oriented in one direction and in the opposite direction along the axial direction of the rotary shaft, and that senses the rotation of the rotary shaft, wherein the magnetic sensing device comprises at least three magnetic sensors and a substrate having a mounting face for mounting the three magnetic sensors thereto; each magnetic sensor comprises a magnetic wire generating large Barkhausen effects, a coil provided on the outer periphery of the magnetic wire, and a bobbin having a wire winding portion, whose external geometry is formed in a cylindrical-like configuration and around which the electrical wire of the coil is wound, and a magnetic wire installation portion, which is a space extending through the wire winding portion in the axial direction thereof and in which the magnetic wire is disposed; the three magnetic sensors are disposed on the mounting face such that the direction of extension of each respective magnetic wire is parallel to the mounting face; the three magnetic sensors and the substrate are disposed on the outer periphery of the trackway of the two magnetic field forming portions such that the direction of extension of the magnetic wire of each magnetic sensor is parallel to the axial direction of the rotary shaft; and, in each of the three magnetic sensors, the location of the magnetic wire installation portion in the bobbin is configured such that the respective magnetic wires of the three magnetic sensors are respectively equidistant from the rotary shaft.

Further, in the inventive magnetic sensing device described above, the distance between the magnetic wire installation portion of the bobbin of the middle magnetic sensor among the three magnetic sensors and the mounting face may be smaller than the distances between the magnetic wire installation portions of the bobbins of the magnetic sensors that are located at both ends among the three magnetic sensors and the mounting face.

In addition, in the inventive magnetic sensing device described above, the magnetic wire installation portion in the bobbin of each magnetic sensor is a groove that is formed to run from the peripheral surface of the wire winding portion toward the interior of the wire winding portion and that extends through the wire winding portion in the axial direction thereof, and the groove formed in the wire winding portion of the bobbin of the middle magnetic sensor of the three magnetic sensors may be configured to be deeper than the grooves formed in the wire winding portions of the bobbins of the magnetic sensors located at both ends among the three magnetic sensors.

In addition, in the inventive magnetic sensing device described above, the cross-sectional shape of the coil of each magnetic sensor may have a substantially elliptical shape whose major axis extends in a direction perpendicular to the mounting face.

In addition, in the inventive magnetic sensing device described above, the cross-sectional shape of the wire winding portion of the bobbin of each magnetic sensor may also have a substantially elliptical shape whose major axis extends in a direction perpendicular to the mounting face.

In order to eliminate the above-mentioned problems, the inventive rotation sensing device is a rotation sensing device that senses the rotation of a rotary shaft and comprises at least two magnetic field forming portions traveling about the periphery of the rotary shaft along with the rotation of the rotary shaft while respectively forming magnetic fields oriented in one direction and in the opposite direction along the axial direction of the rotary shaft, and a magnetic sensing portion that senses the magnetic fields formed by the two magnetic field forming portions without moving along with the rotation of the rotary shaft; the magnetic sensing portion comprises at least three magnetic sensors and a substrate having a mounting face for mounting the three magnetic sensors thereto; each magnetic sensor comprises a magnetic wire generating large Barkhausen effects, a coil provided on the outer periphery of the magnetic wire, and a bobbin having a wire winding portion, whose external geometry is formed in a cylindrical-like configuration and around which the electrical wire of the coil is wound, and a magnetic wire installation portion, which is a space extending through the wire winding portion in the axial direction thereof and in which the magnetic wire is disposed; the three magnetic sensors are disposed on the mounting face such that the direction of extension of each respective magnetic wire is parallel to the mounting face; the magnetic sensing portion is disposed on the outer periphery of the trackway of the two magnetic field forming portions such that the direction of extension of the magnetic wire of each magnetic sensor is parallel to the axial direction of the rotary shaft; and, in each magnetic sensor, the location of the magnetic wire installation portion in the wire winding portion of the bobbin is configured such that the respective magnetic wires of the three magnetic sensors are respectively equidistant from the rotary shaft.

Technical Effect

According to the present invention, if three or more magnetic sensors are mounted in a space-saving manner to a single substrate, the magnetic wires in these magnetic sensors can still be made respectively equidistant from the axis of the rotary shaft, thereby providing for increased accuracy of signal processing intended for recognizing the rotation of the rotary shaft.

BRIEF DESCRIPTION OF DRAWINGS

FIGS. 13(A) to 13(F) illustrate an explanatory diagram illustrating the operation of the rotation sensing device in the inventive embodiment.

DETAILED DESCRIPTION (Rotation Sensing Device)

Figure 1:
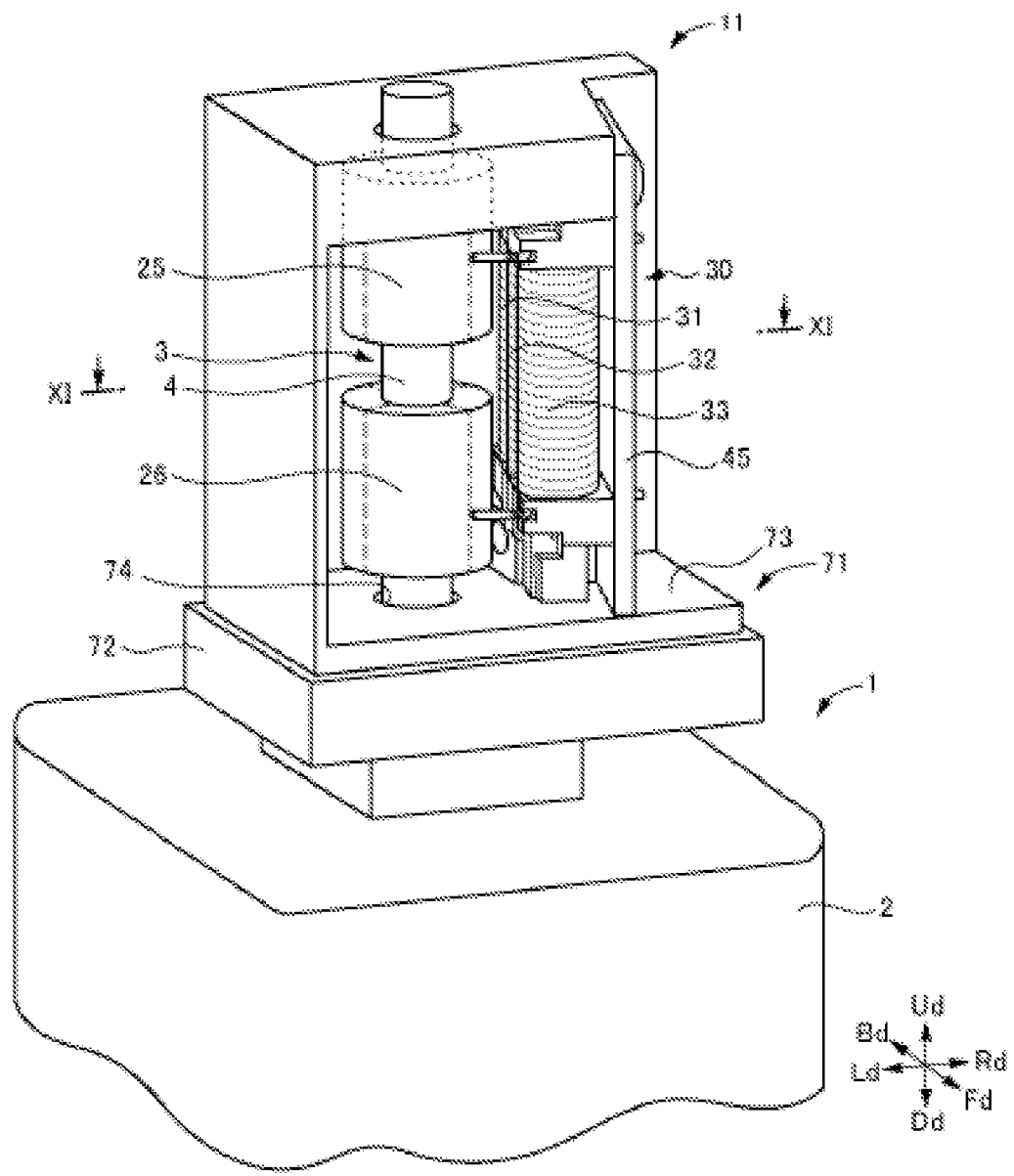
FIG. 1 is an oblique view illustrating an electric motor and a rotation sensing device according to an inventive embodiment with its housing removed.

FIG. 1 illustrates a rotation sensing device 11 according to the inventive embodiment with its housing removed, as well as an electric motor 1, into which the rotation sensing device 11 is assembled. The electric motor 1 is a specific example of a rotary device. As shown in FIG. 1, the electric motor 1 comprises a main body 2 and a rotary shaft 3 rotatably provided in the main body 2. The rotary shaft 3 rotates relative to the main body 2 when the electric motor 1 is running. In addition, one end of the rotary shaft 3 protrudes from the main body 2. Below, the end section of the rotary shaft 3 that protrudes from the main body 2 is referred to as protruding portion 4.

It should be noted that when directions such as up (Ud), down (Dd), forward (Fd), back (Bd), left (Ld), and right (Rd) are mentioned in the description of the embodiment, as a rule, they correspond to the arrows drawn in the lower right corner of FIG. 1, etc. In addition, throughout the description of the embodiment, it is assumed that the electric motor 1 is disposed such that one end of the rotary shaft 3 faces up, as shown in FIG. 1.

The rotation sensing device 11 is an electromagnetic rotation sensing device that makes use of magnetic wires generating large Barkhausen effects. The rotation sensing device 11 is provided on the periphery of the protruding portion 4 of the rotary shaft 3 and is supported on the main body 2 of the electric motor 1 with the help of a holder 71.

The rotation sensing device 11 senses the rotation of the rotary shaft 3 of the electric motor 1. Specifically, when the electric motor 1 and rotation sensing device 11 are turned on, the rotation sensing device 11 senses the rotation of the rotary shaft 3 and outputs the sensing results, for example, to a drive control circuit in the electric motor 1. The drive control circuit of the electric motor 1 controls the operation of the electric motor based on the sensing results output from the rotation sensing device 11.

In addition, the rotation sensing device 11 can operate without electric power (see Patent Document 1 above). When the rotary shaft 3 rotates upon application of an external force to the rotary shaft 3 while the electric motor 1 and rotation sensing device 11 are turned off, the rotation sensing device 11 senses its rotation and stores the sensing results. Subsequently, when the electric motor 1 and rotation sensing device 11 are turned on, the rotation sensing device 11 outputs the sensing results stored while the electric motor 1 and the rotation sensing device 11 were turned off to the drive control circuit of the electric motor 1. This allows the drive control circuit of the electric motor 1 to recognize the amount of rotation of the rotary shaft 3 during the shutdown of the electric motor 1 and rotation sensing device 11 once drive control over the electric motor 1 is resumed.

Figure 2:
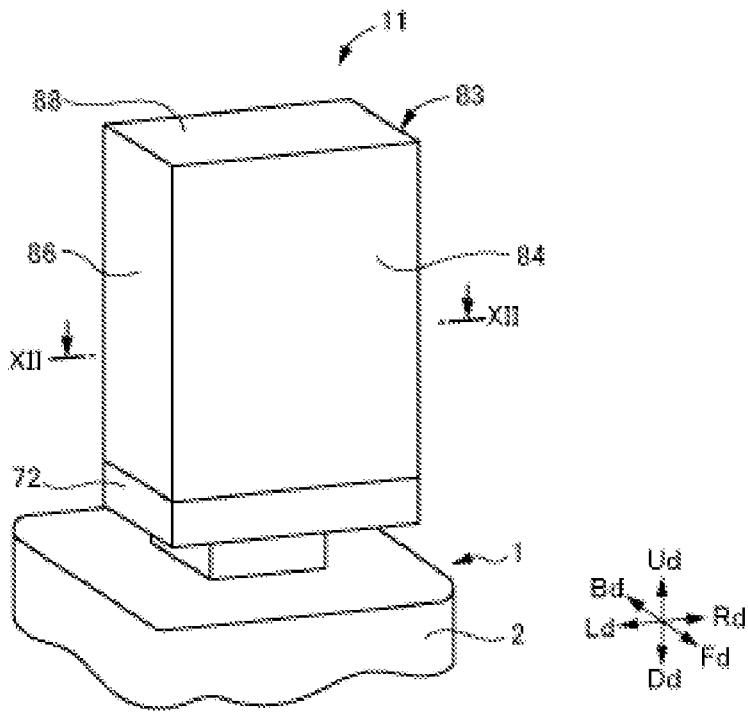
FIG. 2 is an oblique view illustrating the electric motor and the rotation sensing device according to the inventive embodiment with its housing attached.

FIG. 2 illustrates the rotation sensing device 11 with its housing attached and the electric motor 1. The rotation sensing device 11 comprises a housing 83. As shown in FIG. 2, the housing 83 has a front wall panel 84 located in front of the protruding portion 4 of the rotary shaft 3, a rear wall panel 85 located behind the protruding portion 4 (see FIG. 12), a left wall panel 86 located to the left of the protruding portion 4, a right wall panel 87 located to the right of the protruding portion 4 (see FIG. 12), and a top wall panel 88 located above the protruding portion 4. The housing 83, which is formed by the front wall panel 84, rear wall panel 85, left wall panel 86, right wall panel 87, and top wall panel 88 in the shape of a square cylinder sealed at the top, covers the periphery of the protruding portion 4 of the rotary shaft 3, ring magnets 25, 26, and magnetic sensing portion 30. In addition, the housing 83 is secured to the holder 71. Further, the respective dimensions of the front wall panel 84 and rear wall panel 85 in the left-to-right direction are, for example, about 20 mm, and the respective dimensions of the left wall panel 86 and the right wall panel 87 in the forward-backward direction are, for example, about 15 mm.

Figure 3:
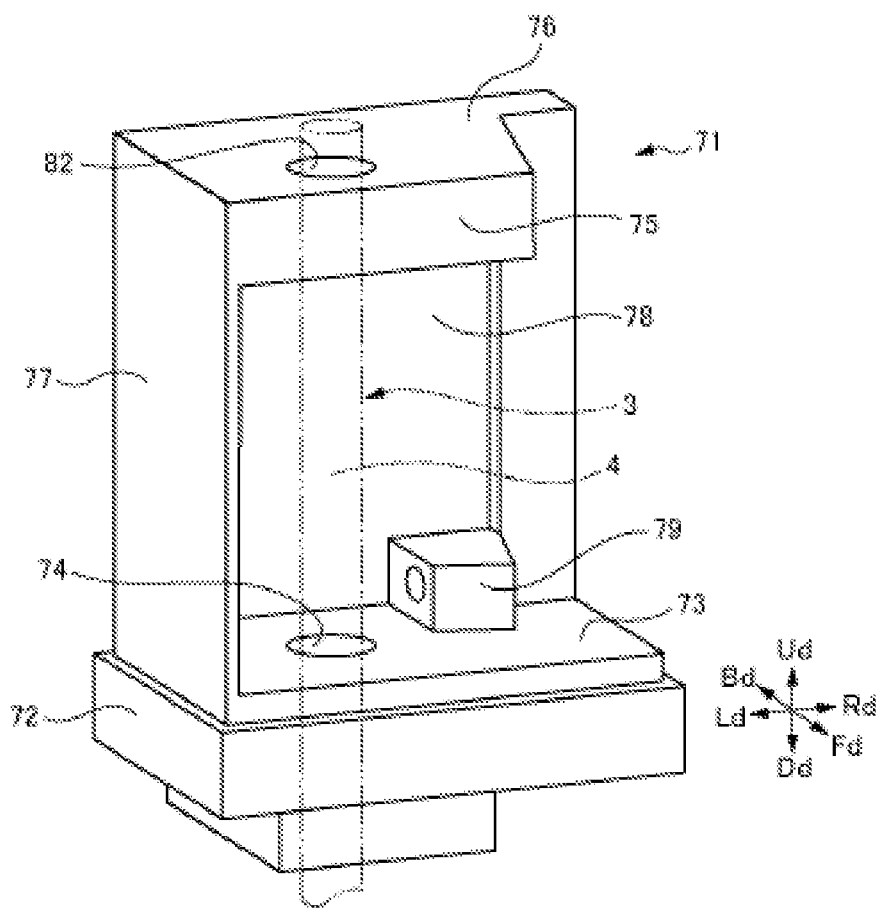
FIG. 3 is an oblique view illustrating a holder in the rotation sensing device according to the inventive embodiment.

FIG. 3 illustrates the holder 71. As shown in FIG. 3, the holder 71 comprises a lower base 72 secured to the main body 2 of the electric motor 1, an upper base 75 provided above the lower base 72, and wall portions 77, 78 used to support the upper base 75 above the lower base 72. The lower base 72 is formed in a generally cuboid configuration and has a base surface 73 of a rectangular shape when viewed from above. In addition, a shaft-receiving through hole 74 is provided in the lower base 72 for passing the protruding portion 4 of the rotary shaft 3 therethrough, with said shaft-receiving through hole 74 formed in the base surface 73. In addition, the upper base 75 is also formed in a generally cuboid configuration and is provided with a shaft-receiving through hole 82 for passing the protruding portion 4 of the rotary shaft 3 therethrough. The protruding portion 4 of the rotary shaft 3 extends upwards through the holder 71 by passing through shaft-receiving through hole 74 in the lower base 72 and shaft-receiving through hole 82 in the upper base 75. In addition, the holder 71 does not interfere with the rotation of the rotary shaft 3 because the respective diameters of shaft-receiving through hole 74 in the lower base 72 and shaft-receiving through hole 82 in the upper base 75 are configured to be larger than the diameter of the protruding portion 4 of the rotary shaft 3. In addition, the distance from the base surface 73 of the lower base 72 to the top face 76 of the upper base 75 is, for example, about 20 mm.

Figure 4A:
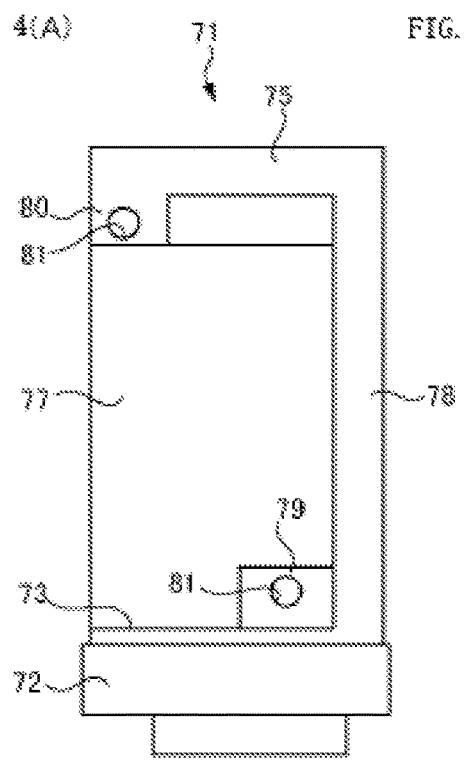
FIGS. 4(A) and 4(B) are explanatory diagrams illustrating a structure used to mount the magnetic sensing portion to the holder in the inventive embodiment.
Figure 4B:
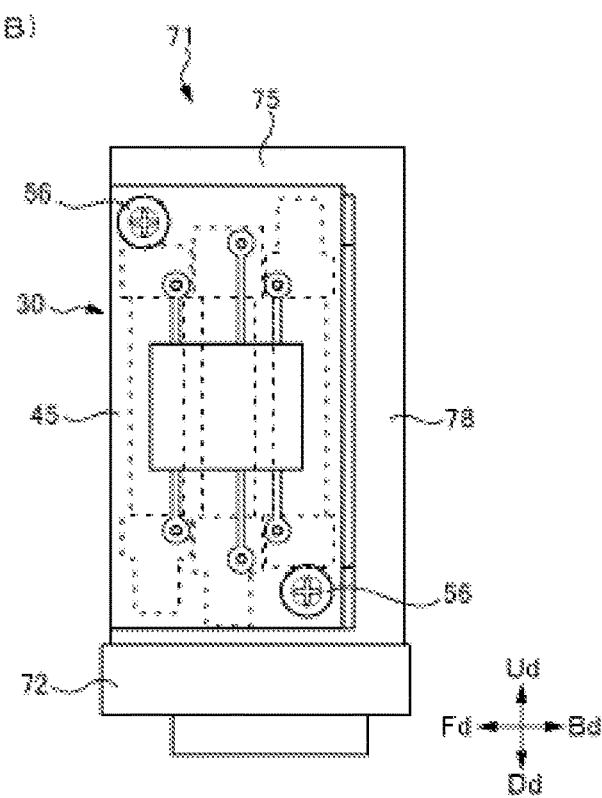

FIG. 4(A) illustrates the holder 71 as viewed from the right. As shown in FIG. 4(A), the holder 71 is provided with two mounting portions 79, 80 for attaching the magnetic sensing portion 30 of the rotation sensing device 11. One mounting portion 79 is provided in the right rear portion of the lower base 72 and the other mounting portion 80 is provided in the right front portion of the upper base 75. A screw hole 81 is provided in each mounting portion 79, 80. FIG. 4(B) illustrates the holder 71 shown in FIG. 4(A) with the magnetic sensing portion 30 attached thereto. As shown in FIG. 4(B), the magnetic sensing portion 30 is attached to the mounting portions 79, 80 of the holder 71 using screws 56.

The rotation sensing device 11 comprises four magnetic field forming portions that travel about the periphery of the rotary shaft 3 along with the rotation of the rotary shaft 3 while respectively forming magnetic fields oriented in one direction and in the opposite direction along the axial direction of the rotary shaft 3, and a magnetic sensing portion 30 that senses the magnetic fields formed by the four magnetic field forming portions without moving along with the rotation of the rotary shaft 3. As shown in FIG. 1, the four magnetic field forming portions are formed by two ring magnets 25, 26 attached to the outer perimeter of the protruding portion 4 of the rotary shaft 3. In addition, the magnetic sensing portion 30, which comprises three magnetic sensors 31-33 and a substrate 45, is attached to the mounting portions 79, 80 of the holder 71.

(Magnetic Field Forming Portions)

Figure 5:
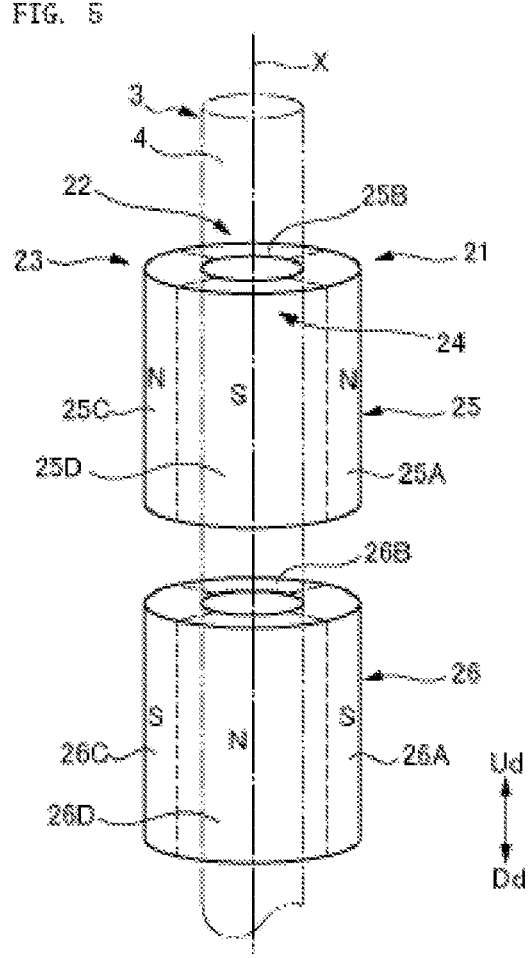
FIG. 5 is an oblique view illustrating the disposition of the magnetic field forming portions in the inventive embodiment.

FIG. 5 illustrates the four magnetic field forming portions 21-24 of the rotation sensing device 11. As shown in FIG. 5, the two ring magnets 25, 26 are attached to the outer perimeter of the protruding portion 4 of the rotary shaft 3. Ring magnet 25 is attached to the top section of the protruding portion 4 (the section on one side along the axial direction of the rotary shaft 3), and ring magnet 26 is attached to the bottom section of the protruding portion 4 (the section on the opposite side in the axial direction of the rotary shaft 3). Each ring magnet 25, 26 is a permanent magnet formed in an annular configuration. Each ring magnet 25, 26 is secured to the exterior peripheral surface of the protruding portion 4 using, for example, an adhesive or the like. Each ring magnet 25, 26 rotates with the rotary shaft 3. Namely, when the rotary shaft 3 rotates, each ring magnet 25, 26 travels about the periphery of the rotary shaft 3 so as to describe a circle centered on the axis X of the rotary shaft 3.

Each ring magnet 25, 26 is magnetized such that multiple magnetic poles are disposed on the outer periphery thereof. In particular, four magnetic poles 25A-25D are disposed at 90-degree intervals on the outer periphery of ring magnet 25. In addition, four magnetic poles 26A-26D are disposed at 90-degree intervals on the outer periphery of ring magnet 26. Further, the circumferential positions of magnetic pole 25A and magnetic pole 26A coincide with each other and are aligned so as to be adjacent in the vertical direction (in the axial direction of the rotary shaft 3). Similarly, the circumferential positions of magnetic pole 25B and magnetic pole 26B coincide with each other, the circumferential positions of magnetic pole 25C and magnetic pole 26C coincide with each other, and the circumferential positions of magnetic pole 25D and magnetic pole 26D coincide with each other.

In addition, in ring magnet 25, the magnetic poles 25A-25D are disposed such that two circumferentially adjacent magnetic poles are different from each other. Further, in ring magnet 26, the magnetic poles 26A-26D are disposed such that two circumferentially adjacent magnetic poles are different from each other. In addition, the two ring magnets 25, 26 are disposed such that two magnetic poles adjacent in the vertical direction are different from each other. For example, the four magnetic poles 25A, 25C, 26B, and 26D are N poles. Likewise, the four magnetic poles 25B, 25D, 26A, and 26C are S poles.

The first magnetic field forming portion 21 of the four magnetic field forming portions 21-24 is formed by magnetic pole 25A and magnetic pole 26A. The first magnetic field forming portion 21 forms a downwardly directed magnetic field (a magnetic field oriented in one direction along the axial direction of the rotary shaft 3). The second magnetic field forming portion 22 is formed by magnetic pole 25B and magnetic pole 26B. The second magnetic field forming portion 22 forms an upwardly directed magnetic field (a magnetic field oriented in the opposite direction along the axial direction of the rotary shaft 3). The third magnetic field forming portion 23 is formed by magnetic pole 25C and magnetic pole 26C. The third field forming region 23 forms a downwardly directed magnetic field (a magnetic field oriented in one direction along the axial direction of the rotary shaft 3). The fourth magnetic field forming portion 24 is formed by magnetic pole 25D and magnetic pole 26D. The fourth magnetic field forming portion 24 forms an upwardly directed magnetic field (a magnetic field oriented in the opposite direction along the axial direction of the rotary shaft 3). Thus, the four magnetic field forming portions 21-24 are formed on the outer perimeter of the protruding portion 4 of the rotary shaft 3 by the magnetic poles 25A-25D of ring magnet 25 and the magnetic poles 26A-26D of ring magnet 26, and are disposed at 90-degree intervals on the outer perimeter of the protruding portion 4. In addition, these magnetic field forming portions 21-24 are disposed such that the directions of the magnetic fields formed by two circumferentially adjacent magnetic field forming portions are different from each other (opposite to each other). In addition, when the rotary shaft 3 rotates, these magnetic field forming portions 21-24 travel about the periphery of the rotary shaft 3 so as to describe a circle centered on the axis X of the rotary shaft 3.

(Magnetic Sensing Portion)

Figure 6A:
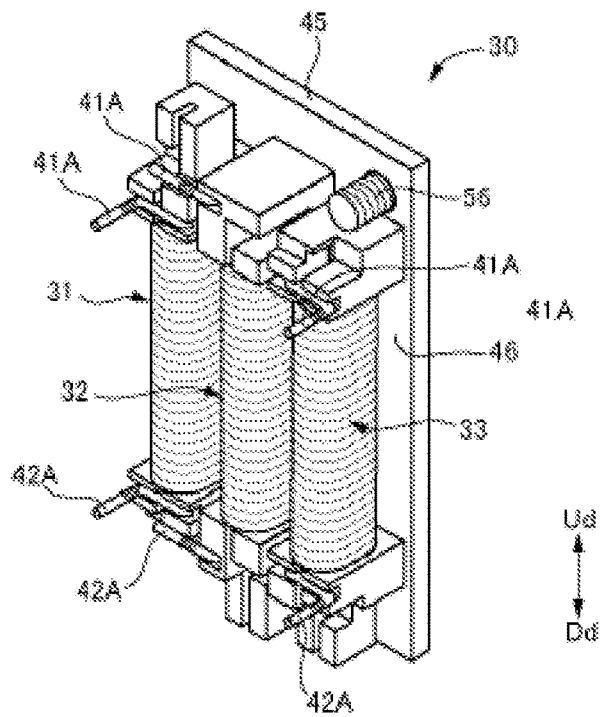
FIGS. 6(A) and 6(B) are explanatory diagrams illustrating the magnetic sensing portion in the inventive embodiment.
Figure 6B:
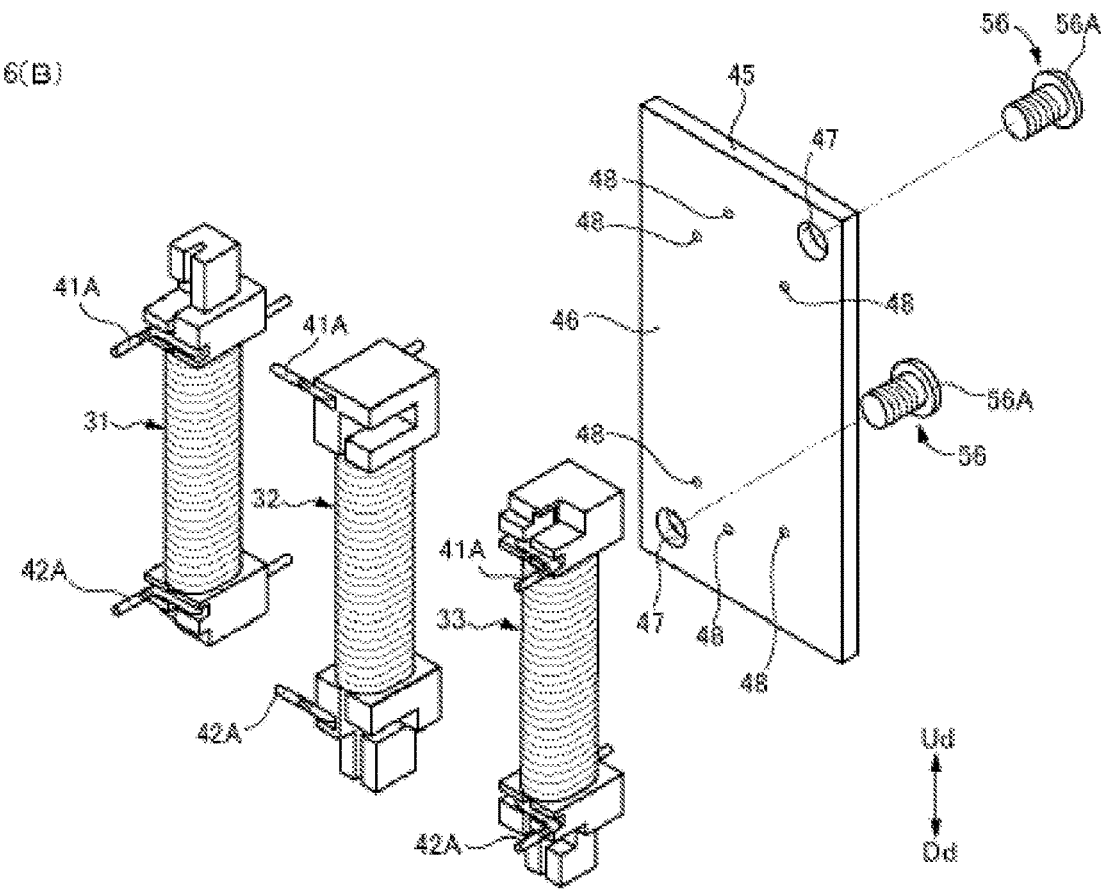
Figure 7:
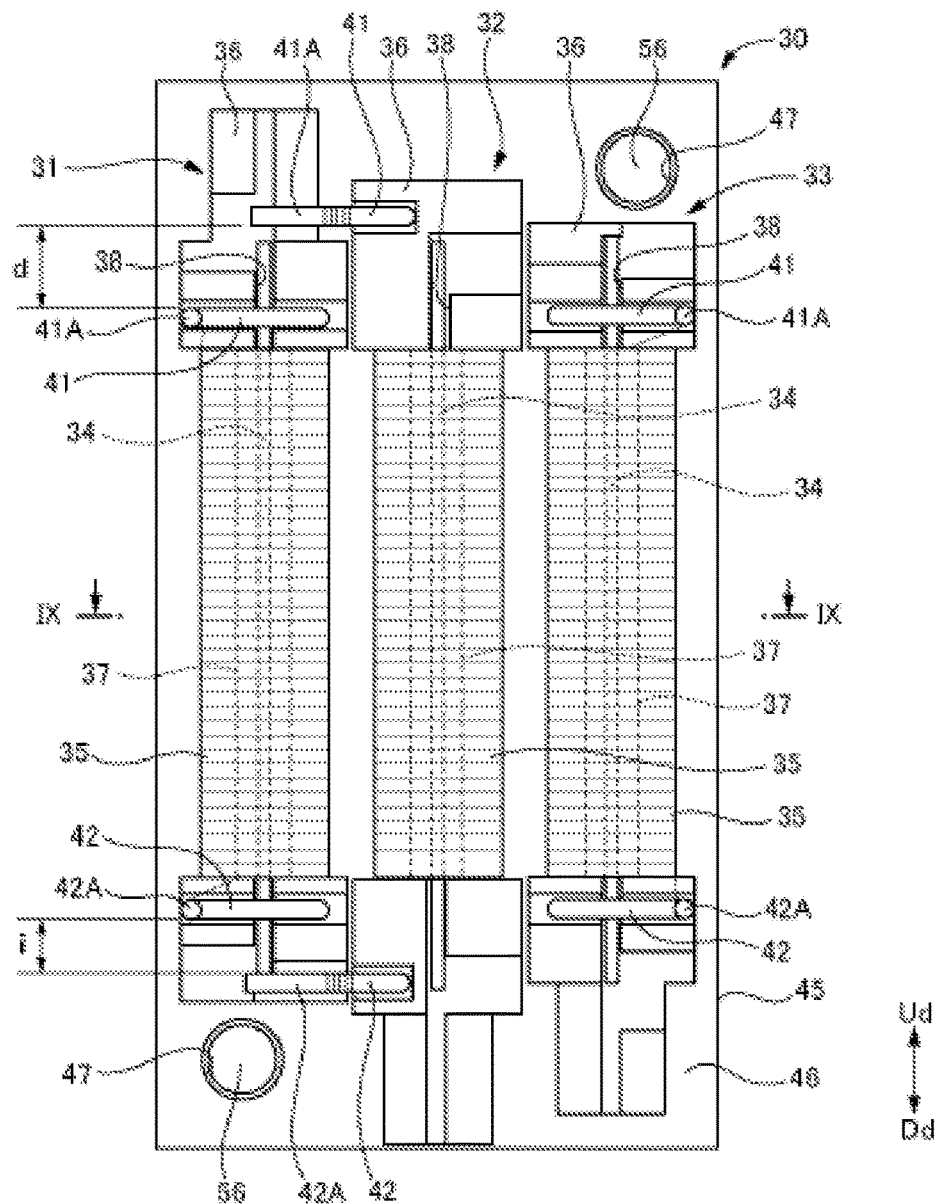
FIG. 7 is a front view of the magnetic sensing portion in the inventive embodiment.
Figure 8:
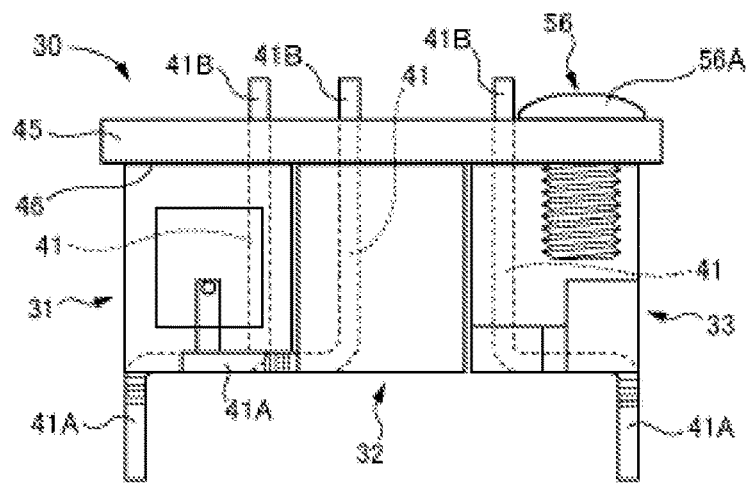
FIG. 8 is a plan view of the magnetic sensing portion in the inventive embodiment.
Figure 9:
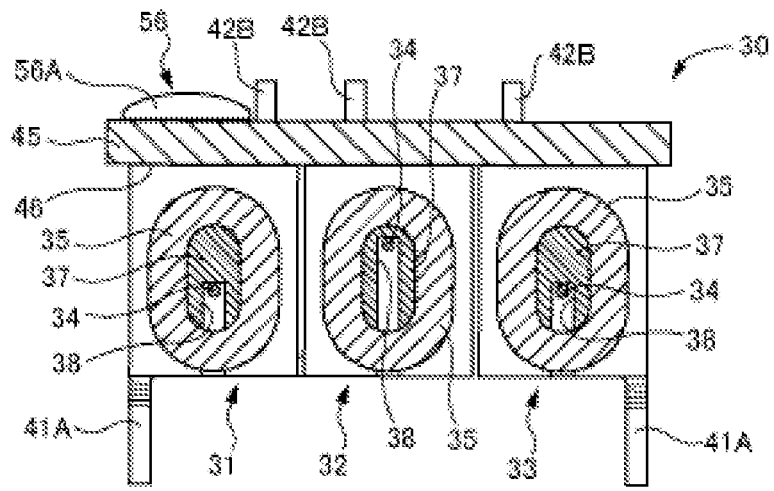
FIG. 9 is a cross-sectional view illustrating a cross-section of the magnetic sensing portion taken along section line IX-IX in FIG. 7, as viewed from above in FIG. 7.
Figure 10:
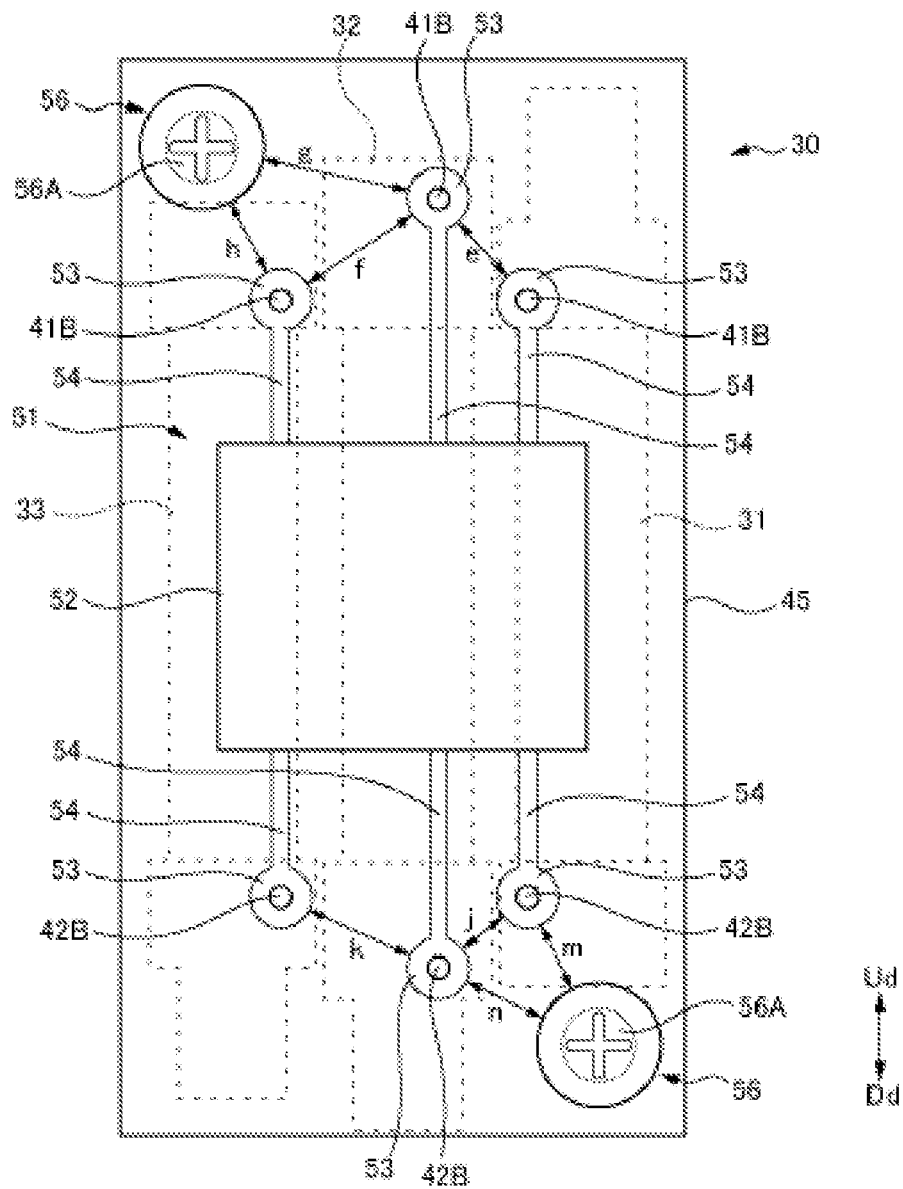
FIG. 10 is a rear view of the magnetic sensing portion in the inventive embodiment.
Figure 11:
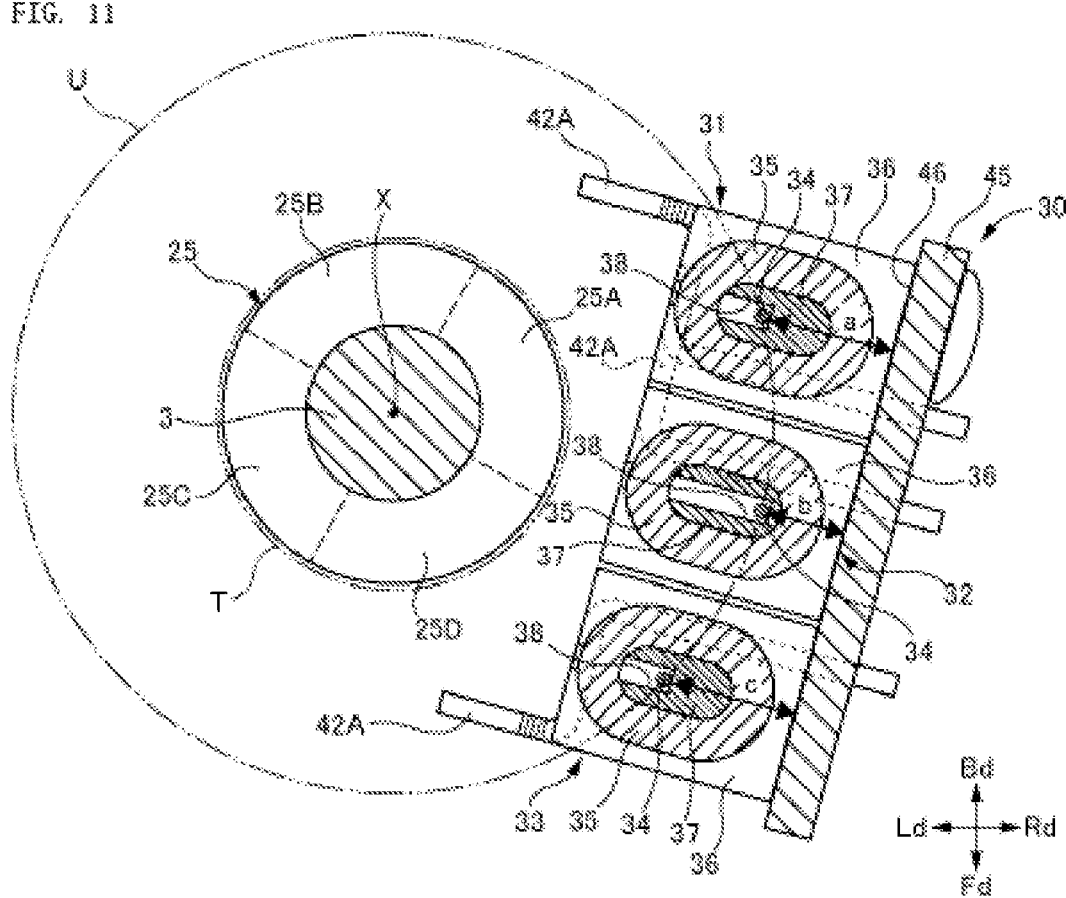
FIG. 11 is a cross-sectional view illustrating a cross-section, etc., of the rotary shaft and the magnetic sensing portion taken along section line XI-XI in FIG. 1, as viewed from above in FIG. 1.

FIG. 6(A) illustrates the magnetic sensing portion 30. FIG. 6(B) shows the magnetic sensing portion 30 in a disassembled condition. FIG. 7 shows the magnetic sensing portion 30 as viewed from the front thereof. FIG. 8 shows the magnetic sensing portion 30 of FIG. 7 as viewed from above in FIG. 7. FIG. 9 shows a cross-section of the magnetic sensing portion 30 taken along section line IX-IX in FIG. 7 as viewed from above in FIG. 7. FIG. 10 shows the rear face of the magnetic sensing portion 30. FIG. 11 shows a cross-section, etc., of the rotary shaft 3 and the magnetic sensing portion 30 taken along section line XI-XI in FIG. 1.

As described above, the magnetic sensing portion 30 comprises three magnetic sensors 31-33 and a substrate 45. As shown in FIG. 7, each magnetic sensor 31-33 comprises a magnetic wire 34, a coil 35, a bobbin 36, a first connecting member 41, and a second connecting member 42. It should be noted that along with representing a specific example of the magnetic sensing portion of the rotation sensing device described in the claims, the magnetic sensing portion 30 is a specific example of a magnetic sensing device.

The magnetic wire 34 is a large Barkhausen element. Specifically, the magnetic wire 34, which is a linear ferromagnetic body generating large Barkhausen effects, possesses uniaxial anisotropy. The magnetic wire 34 is called a composite magnetic wire. The magnetic wire 34 can be formed by twisting semi-rigid magnetic wire containing, for example, iron and cobalt. The length of the magnetic wire 34 is, for example, approximately 10 to 18 mm.

The coil 35 is provided on the outer periphery of the magnetic wire 34. The coil 35 is formed by winding wire, for example, enameled wire and the like, onto the bobbin 36.

The bobbin 36 is formed from resin material, for example, in an overall cylindrical configuration. As shown in FIG. 9, the bobbin 36 has a wire winding portion 37, onto which the electrical wire of the coil 35 is wound, and a magnetic wire installation portion 38, in which the magnetic wire 34 is disposed.

The wire winding portion 37 is formed in the axially intermediate portion of the bobbin 36. The wire winding portion 37 has a cylindrical external geometry. The electrical wire of the coil 35 is wound onto the outer periphery of the wire winding portion 37. It should be noted that specific illustrations of the electrical wire of the coil 35 have been omitted in FIG. 9, FIG. 11 and FIG. 12.

The magnetic wire installation portion 38 is a space extending through the wire winding portion 37 in the axial direction thereof. Specifically, the magnetic wire installation portion 38 is a groove that is formed to run from the peripheral surface of the wire winding portion 37 toward the interior of the wire winding portion 37 and that extends through the wire winding portion 37 in the axial direction thereof. As shown in FIG. 9, the magnetic wire 34 is disposed within the magnetic wire installation portion 38. Specifically, the magnetic wire 34 is disposed at the bottom of the groove (e.g., on the bottom face of the groove) constituting the magnetic wire installation portion 38. As a result of being disposed within the magnetic wire installation portion 38, the magnetic wire 34 is positioned inwardly of the coil 35. In addition, as shown in FIG. 7, the top end of the magnetic wire installation portion 38 extends beyond the top end of the wire winding portion 37 toward the top end of the bobbin 36, and the bottom end of the magnetic wire installation portion 38 extends beyond the bottom end of the wire winding portion 37 toward the bottom end of the bobbin 36. Further, the top end of the magnetic wire 34 extends beyond the top end of the coil 35 toward the top end of the bobbin 36, and the bottom end of the magnetic wire 34 extends beyond the bottom end of the coil 35 toward the bottom end of the bobbin 36.

Along with serving as support posts for anchoring the ends of the electrical wires of the coils 35, the first connecting member 41 and the second connecting member 42, respectively, serve as terminals electrically connecting the coils 35 to an electric circuit 51 formed on the substrate 45 (see FIG. 10). The first connecting member 41 and the second connecting member 42 are respectively formed in a rod-like configuration from, for example, metal or another electrically conductive material. As shown in FIG. 7, the first connecting member 41 is provided in the top end section of the bobbin 36 and the second connecting member 42 is provided in the bottom end section of the bobbin 36. In addition, as shown in FIG. 8, one end of the electrical wire of the coil 35 is wound around and anchored to one end section 41A of the first connecting member 41 (bottom end section in FIG. 8). Further, the other end of the electrical wire of the coil 35 is wound around and anchored to one end section 42A of the second connecting member 42. In addition, the other end section 41B of the first connecting member 41 (top end section in FIG. 8) is electrically connected to the electric circuit 51 formed on the substrate 45. The other end section 42B of the second connecting member 42 is also electrically connected to the electric circuit 51.

The substrate 45 is a printed board made of, for example, epoxy-glass. The substrate 45 is formed, for example, in a rectangular planar configuration with a long side of about 20 mm and a short side of about 10.5 mm. Further, as shown in FIG. 6(B), the front face of the substrate 45 serves as a mounting face 46, to which the three magnetic sensors 31-33 are mounted. In addition, screw insertion openings 47, which are intended for passing therethrough screws 56 used for attaching the magnetic sensing portion 30 to the mounting portions 79, 80 of the holder 71, are respectively formed in two corners of the substrate 45. Further, six connecting member insertion holes 48 used for passing therethrough the other end sections 41B, 42B of the first connecting member 41 and the second connecting member 42 forming part of the respective three magnetic sensors 31-33, are formed in the substrate 45.

In addition, as shown in FIG. 10, the electric circuit 51 is formed on the rear face of the substrate 45. The electric circuit 51 has an IC (integrated circuit) 52, which performs signal processing intended for recognizing the rotation of the rotary shaft 3 based on detection signals output from the respective coils 35 of the three magnetic sensors 31-33, six lands 53, to which the other end sections 41B, 42B of the first connecting member 41 and the second connecting member 42 forming part of the respective three magnetic sensors 31-33 are electrically connected, and wiring 54 used for electrically interconnecting each land 53 and the IC 52. The six lands 53 are disposed at locations corresponding to the six connecting member insertion holes 48. Each connecting member insertion hole 48 is located in the center of a land 53. The other end sections 41B, 42B of the first connecting member 41 and the second connecting member 42 of each magnetic sensor 31-33 pass through the connecting member insertion holes 48 from the mounting face 46 of the substrate 45 all the way to the rear face of the substrate 45 and are connected to the lands 53 formed on the rear face of the substrate 45 by soldering and the like. It should be noted that while the IC 52 is illustrated in FIG. 4(A), FIG. 4(B) and FIG. 10, it is not depicted in other drawings.

As shown in FIG. 6(A), the three magnetic sensors 31-33 are disposed on the mounting face 46 such that the directions of extension of the respective magnetic wires 34 are parallel to the mounting face 46 of the substrate 45. In addition, the three magnetic sensors 31-33 are placed side-by-side on the mounting face 46 such that the directions of extension of the magnetic wires 34 are parallel to each other. Further, the three magnetic sensors 31-33 are disposed on the mounting face 46 such that the three magnetic wires 34 are uniformly spaced from one another when the magnetic sensing portion 30 is viewed from the front. In addition, among the three magnetic sensors 31-33, the spacing between two adjacent magnetic sensors on the mounting face 46 is extremely small. In addition, the bobbins 36 of the three magnetic sensors 31-33 are placed on the flat mounting face 46 of the substrate 45 and the axes of the wire winding portions 37 of the three bobbins 36 (straight lines passing through the centers of the wire winding portions 37 in the axial direction) are located in the same plane that is parallel to the mounting face 46.

In addition, as shown in FIG. 1, the orientation of the magnetic sensing portion 30 is configured such that the mounting face 46 of the substrate 45, to which the three magnetic sensors 31-33 are mounted, faces the protruding portion 4 of the rotary shaft 3 while the directions of extension of the magnetic wires 34 of the three magnetic sensors 31-33 are parallel to the axial direction of the rotary shaft 3. In addition, as shown in FIG. 11, the magnetic sensing portion 30 is disposed on the outer periphery of the protruding portion 4 of the rotary shaft 3 as well as on the outer periphery of the trackway T of the four magnetic field forming portions 21-24. In addition, as shown in FIG. 4(B), the magnetic sensing portion 30 is secured to the holder 71 by attaching two corners of the substrate 45 to the mounting portions 79, 80 of the holder 71 using screws 56.

Thus, according to the inventive embodiment, the rotation sensing device 11 is made more compact by mounting the three magnetic sensors 31-33 in a space-saving manner to a single substrate. In particular, the rotation sensing device 11 can be fitted within a cylindrical-like area of a small diameter surrounding the rotary shaft 3 by using a configuration in which the three magnetic sensors 31-33 are mounted to the mounting face 46 of one substrate 45 such that the respective directions of extension of the magnetic wires 34 are parallel to the mounting face 46 of the substrate 45 and the respective directions of extension of the magnetic wires 34 are parallel to one another, and this substrate 45 is attached to the holder 71 such that the directions of extension of the magnetic wires 34 of the three magnetic sensors 31-33 are parallel to the axial direction of the rotary shaft 3. Therefore, the present embodiment makes it possible to implement a rotation sensing device 11 capable of being attached to a compact electric motor 1 with a small-diameter main body 2.

(Location of Magnetic Wire Installation Portions and Shape of Coils)

As shown in FIG. 11, the location of the magnetic wire installation portion 38 in the bobbin 36 in each of the three magnetic sensors 31-33 is configured such that the three magnetic wires 34 forming part of the three magnetic sensors 31-33 are respectively equidistant from the axis X of the rotary shaft 3 and, in addition, the three magnetic wires 34 are disposed at a predetermined spacing about the axis X of the rotary shaft 3.

Specifically, the distance b between the magnetic wire installation portion 38 of the bobbin 36 of the middle magnetic sensor 32 among the three magnetic sensors 31-33 and the mounting face 46 of the substrate 45 is smaller than both distances a, c between the magnetic wire installation portions 38 of the bobbins 36 of the two magnetic sensors 31, 33 located at both ends among three magnetic sensors 31-33 and the mounting face 46 of the substrate 45. More specifically, the groove formed as a magnetic wire installation portion 38 in the bobbin 36 of the middle magnetic sensor 32 is deeper than either of the grooves formed as magnetic wire installation portions 38 in the bobbins 36 of the two magnetic sensors 31, 33 located at both ends. As a result, the distance b between the bottom face of the groove formed as a magnetic wire installation portion 38 in the bobbin 36 of the middle magnetic sensor 32 and the mounting face 46 is smaller than both distances a, c between the bottom faces of the grooves formed as magnetic wire installation portions 38 in the bobbins 36 of the two magnetic sensors 31, 33 located at both ends and the mounting face 46.

In addition, the depths of the grooves formed as magnetic wire installation portions 38 in the bobbins 36 of the two magnetic sensors 31, 33 located at both ends are equal to each other. As a result, the distances a, c between the bottom faces of the grooves formed as magnetic wire installation portions 38 in the bobbins 36 of the two magnetic sensors 31, 33 located at both ends and the mounting face 46 (i.e., the distances between the magnetic wire installation portions 38 of the bobbins 36 of the two magnetic sensors 31, 33 located at both ends and the mounting face 46) are equal to each other.

Configuring the locations of the magnetic wire installation portions 38 of the three magnetic sensors 31-33 in this manner makes the three magnetic wires 34 disposed in these magnetic wire installation portions 38 respectively equidistant from the axis X of the rotary shaft 3. Namely, as shown in FIG. 11, these three magnetic wires 34 are located on the circumference of a circle U centered on the axis X of the rotary shaft 3. In addition, as a result, the three magnetic wires 34 are equidistant from the trackway T of the magnetic field forming portions 21-24. Further, due to the fact that the locations of the magnetic wire installation portions 38 of the three magnetic sensors 31-33 are configured as described above, the three magnetic wires 34 are disposed on the circumference of circle U at a predetermined spacing. In the present embodiment, the three magnetic wires 34 are disposed on the circumference of circle U at 30-degree intervals.

In addition, as shown in FIG. 11, the cross-sectional shape of the wire winding portion 37 of the bobbin 36 in each magnetic sensor 31-33 is a substantially elliptical shape whose major axis extends in a direction perpendicular to the mounting face 46. Further, the cross-sectional shape of the coil 35 of each magnetic sensor 31-33 is a substantially elliptical shape whose major axis extends in a direction perpendicular to the mounting face 46.

Thus, the rotation sensing device 11 of the inventive embodiment makes it possible to dispose the three magnetic sensors 31-33 on the flat mounting face 46 of the substrate 45 while making the three magnetic wires 34 forming part of the respective three magnetic sensors 31 respectively equidistant from the axis X of the rotary shaft 3 by configuring the locations of the magnetic wire installation portions 38 in the bobbins 36 of the magnetic sensors 31-33 such that the distance b between the magnetic wire installation portion 38 of the bobbin 36 of the middle magnetic sensor 32 and the mounting face 46 of the substrate 45 is made smaller than both distances a, c between the magnetic wire installation portions 38 of the bobbins 36 of the two magnetic sensors 31, 33 located at both ends and the mounting face 46 of the substrate 45. In the three magnetic sensors 31-33, the three magnetic wires 34 are made respectively equidistant from the axis X of the rotary shaft 3, thereby making it possible to ensure the uniform timing of the pulses output from the coils 35 of said magnetic sensors when the magnetic field forming portions 21-24 pass through the vicinity of the magnetic sensors, or ensure the uniform height of the pulses output from the coils 35 of the magnetic sensors 31-33. This increases the accuracy of the signal processing performed by the IC 52 to recognize the rotation of the rotary shaft 3. Therefore, in accordance with the present embodiment, the accuracy in the sensing of the rotation of the rotary shaft 3 can be increased while ensuring a smaller footprint for the rotation sensing device 11 by mounting the three magnetic sensors 31-33 in a space-saving manner to a single substrate 45.

In addition, the cross-sectional shape of the wire winding portion 37 of the bobbin 36 in each magnetic sensor 31-33 is a substantially elliptical shape whose major axis extends in a direction perpendicular to the mounting face 46, and the cross-sectional shape of the coil 35 of each magnetic sensor 31-33 is a substantially elliptical shape whose major axis extends in a direction perpendicular to the mounting face 46. This makes it possible to reduce the dimensions of the wire winding portion 37 in a direction perpendicular to the axial direction of the wire winding portion 37 and parallel to the mounting face 46 of the substrate 45. Therefore, an adequate amount of winding of the electrical wire of the coil 35 can be ensured even when mounting the three magnetic sensors 31-33 in a space-saving manner on a small substrate 45. In addition, the dimensions of the wire winding portion 37 in a direction perpendicular to the mounting face 46 of the substrate 45 can be increased, and the strength of the bobbin 36 can be enhanced.

(Disposition of Magnetic Field Sensing Portion)

Figure 12:
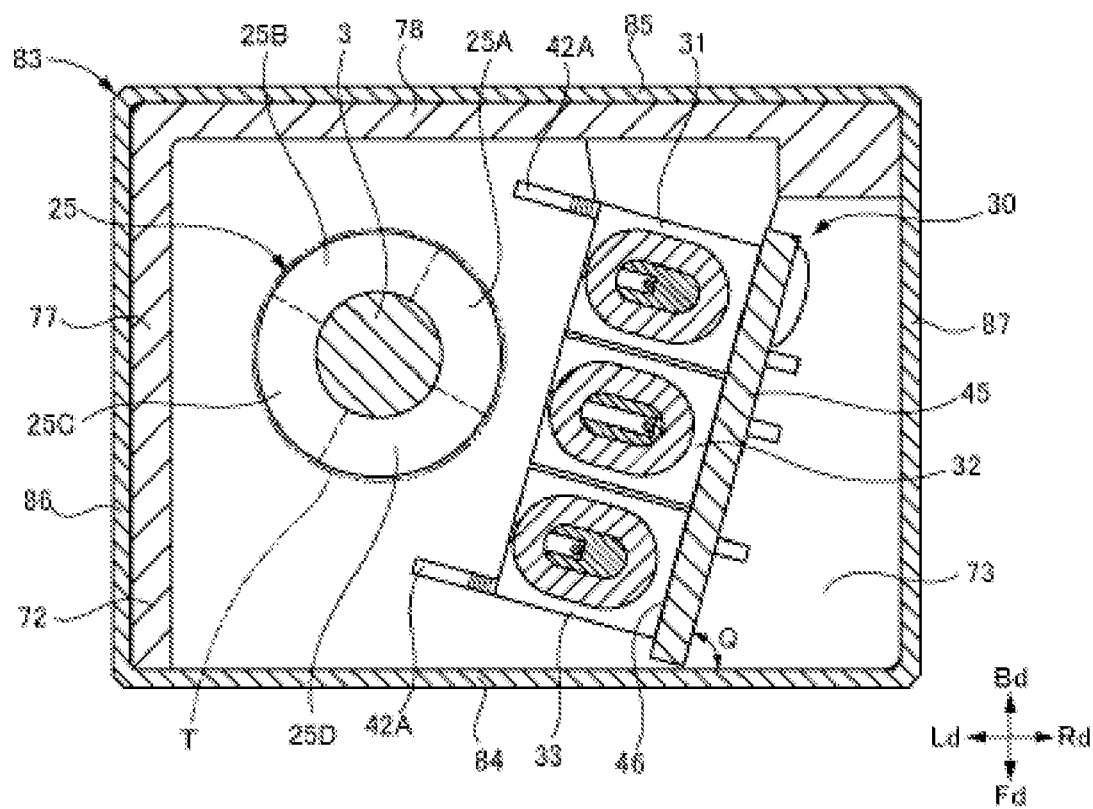
FIG. 12 is a cross-sectional view illustrating a cross-section of the rotation sensing device and the housing taken along section line XII-XII in FIG. 2, as viewed from above in FIG. 2.

FIG. 12 shows a cross-section of the rotation sensing device 11 and the housing 83 taken along section line XII-XII in FIG. 2, as viewed from above in FIG. 2. As shown in FIG. 12, the magnetic sensing portion 30 is disposed on the outer periphery of the trackway T of the four magnetic field forming portions 21-24 such that the magnetic wires 34 of the three magnetic sensors 31-33 are respectively equidistant from the axis X of the rotary shaft 3. In addition, the magnetic sensing portion 30 is disposed within the housing 83 such that the mounting face 46 of the substrate 45 is non-parallel to any one of the rear face of the front wall panel 84, the front face of the rear wall panel 85, the right-hand face of the left wall panel 86, or the left-hand face of the right wall panel 87. In the present embodiment, the magnetic sensing portion 30 is disposed such that the angle Q between the mounting face 46 and the rear face of the front wall panel 84 is, for example, about 75 degrees.

Thus, disposing the magnetic sensing portion 30 within the housing 83 such that the mounting face 46 of the substrate 45 is non-parallel to any one of the rear face of the front wall panel 84, the front face of the rear wall panel 85, the right-hand face of the left wall panel 86, or the left-hand face of the right wall panel 87, allows the magnetic sensing portion 30 to be fitted into a small space within the housing 83, which has a rectangular transverse cross-sectional shape, while satisfying conditions such as (a) the magnetic wires 34 of the three magnetic sensors 31-33 are respectively equidistant from the axis X of the rotary shaft 3, (b) the three magnetic sensors 31-33 are located on the outer periphery of the trackway T of the four magnetic field forming portions 21-24, and (c) the magnetic sensing portion 30 does not interfere with the walls 77, 78 of the holder 71, etc. This allows the rotation sensing device 11 to be made more compact.

(Shape of Connecting Members)

As shown in FIG. 8, the first connecting member 41 of each magnetic sensor 31-33 has a crank-shaped or L-shaped configuration. In the same manner as the first connecting member 41, the second connecting member 42 of each magnetic sensor 31-33 also has a crank-shaped or L-shaped configuration.

Specifically, the first connecting member 41 of magnetic sensor 31 among the three magnetic sensors 31-33, which is disposed in the leftmost position in FIG. 8 has one end section 41A (bottom end section in FIG. 8) as well as the other end section 41B (top end section in FIG. 8) extending in a direction perpendicular to the mounting face 46 of the substrate 45 while its middle section is formed in a crank-like configuration extending parallel to the mounting face 46. In addition, one end section 41A and the other end section 41B of the first connecting member 41 of said magnetic sensor 31 protrude from the bobbin 36 in a direction perpendicular to the mounting face 46. Further, the first connecting member 41 of said magnetic sensor 31 is provided in the bobbin 36 such that one end section 41A, to which the electrical wire of the coil 35 is anchored, is positioned further to the left end of the mounting face 46 in FIG. 8 than the other end section 41B, which is electrically connected to the electric circuit 51. Likewise, the second connecting member 42 of said magnetic sensor 31 is formed with the same geometry as the first connecting member 41 of said magnetic sensor 31 and is provided in the bobbin 36 in the same manner as the first connecting member 41 of said magnetic sensor 31.

In addition, the first connecting member 41 of the magnetic sensor 33 among the three magnetic sensors 31-33, which is disposed in the rightmost position in FIG. 8, is formed in a crank-like configuration in the same manner as the first connecting member 41 of the magnetic sensor 31 disposed in the leftmost position in FIG. 8. Further, one end section 41A and the other end section 41B of the first connecting member 41 of said magnetic sensor 33 protrude from the bobbin 36 in a direction perpendicular to the mounting face 46. In addition, the first connecting member 41 of said magnetic sensor 33 is provided in the bobbin 36 such that one end section 41A, to which the electrical wire of the coil 35 is anchored, is positioned further to the right end of the mounting face 46 in FIG. 8 than the other end section 41B, which is electrically connected to the electric circuit 51. Likewise, the second connecting member 42 of said magnetic sensor 33 is formed with the same geometry as the first connecting member 41 of said magnetic sensor 33 and is provided in the bobbin 36 in the same manner as the first connecting member 41 of said magnetic sensor 33.

In addition, among the three magnetic sensors 31-33, the first connecting member 41 of the middle magnetic sensor 32 has one end section 41A extending in a direction parallel to the mounting face 46 of the substrate 45 while the other end section 41B is formed in an L-shaped configuration extending in a direction perpendicular to the mounting face 46. In addition, the first connecting member 41 of said magnetic sensor 32 is provided in the bobbin 36 such that one end section 41A, to which the electrical wire of the coil 35 is anchored, protrudes from the bobbin 36 toward the left end of the mounting face 46 in FIG. 8. Likewise, the second connecting member 42 of said magnetic sensor 32 is formed with the same geometry as the first connecting member 41 of said magnetic sensor 32 and is provided in the bobbin 36 in the same manner as the first connecting member 41 of said magnetic sensor 32. It should be noted that the geometry of both ends of the bobbin 36 of the magnetic sensor 31 is such that the end sections 41A, 42A of the first connecting member 41 and the second connecting member 42 protruding from the bobbin 36 of the middle magnetic sensor 32 do not come into contact with the bobbin 36 of the magnetic sensor 31 disposed in the leftmost position in FIG. 8 (see FIG. 6(A) and FIG. 6(B)).

Here, as can be seen from FIG. 11, when the magnetic sensing portion 30 is mounted to the mounting portions 79, 80 of the holder 71, the magnetic sensing portion 30 is disposed such that the bottom portion of the magnetic sensing portion 30 in FIG. 8 is oriented toward the left back side, and the left portion of the magnetic sensing portion 30 in FIG. 8 is oriented toward the right back side. Furthermore, the magnetic sensing portion 30 is disposed on the outer periphery of the trackway T of the four magnetic field forming portions 21-24 such that the respective magnetic wires 34 of the three magnetic sensors 31-33 are respectively equidistant from the axis X of the rotary shaft 3. In this condition, the end sections 41A, 42A of the first connecting member 41 and the second connecting member 42 of the magnetic sensor 31 disposed in the rearmost position among the three magnetic sensors 31-33 in FIG. 11 extend from the left back portion of the bobbin 36 of said magnetic sensor 31 toward the left back side, and the distal ends thereof are positioned rearwardly of the rotary shaft 3, the ring magnet 25, and the ring magnet 26. As a result, the end sections 41A, 42A of the first connecting member 41 and the second connecting member 42 of said magnetic sensor 31 never come into contact with the rotary shaft 3, the ring magnet 25, or the ring magnet 26. In addition, the end sections 41A, 42A of the first connecting member 41 and the second connecting member 42 of the magnetic sensor 33 disposed in the forwardmost position among the three magnetic sensors 31-33 in FIG. 11 extend from the left front portion of the bobbin 36 of said magnetic sensor 33 toward the left back side, and the distal ends thereof are positioned forwardly of the rotary shaft 3, the ring magnet 25, and the ring magnet 26. As a result, the end sections 41A, 42A of the first connecting member 41 and the second connecting member 42 of said magnetic sensor 33 never come into contact with the rotary shaft 3, the ring magnet 25, or the ring magnet 26. Further, the end sections 41A, 42A of the first connecting member 41 and the second connecting member 42 of the middle magnetic sensor 32 among the three magnetic sensors 31-33 in FIG. 11 extend from the left back portion of the bobbin 36 of said magnetic sensor 32 toward the right back side, and the distal ends thereof are positioned to the right of the rotary shaft 3, the ring magnet 25, and the ring magnet 26. As a result, the end sections 41A, 42A of the first connecting member 41 and the second connecting member 42 of said magnetic sensor 32 never come into contact with the rotary shaft 3, the ring magnet 25, or the ring magnet 26.

Thus, in the magnetic sensors 31, 33 located at both ends, forming the first connecting member 41 and the second connecting member 42 in a crank-like configuration and providing these first connecting member 41 and second connecting member 42 in the bobbin 36 such that their end sections 41A, 42A are positioned further toward the end of the mounting face 46 of the substrate 45 than the other end sections 41B, 42B makes it possible to prevent the end sections 41A, 42A of the first connecting member 41 and the second connecting member 42 of the magnetic sensors 31, 33 from coming into contact with the rotary shaft 3, the ring magnet 25, or the ring magnet 26 even if the magnetic sensing portion 30 is provided within a small space in the housing 83 as shown in FIG. 12. This allows for a more compact design of the rotation sensing device 11.

In addition, in the middle magnetic sensor 32, forming the first connecting member 41 and the second connecting member 42 in an L-shaped configuration and providing these first connecting member 41 and second connecting member 42 in the bobbin 36 such that their end section 41A protrudes from the bobbin 36 in a direction parallel to the mounting face 46 of the substrate 45 makes it possible to prevent the end sections 41A, 42A of the first connecting member 41 and the second connecting member 42 of the magnetic sensor 32 from coming into contact with the rotary shaft 3, the ring magnet 25, or the ring magnet 26 even if the magnetic sensing portion 30 is provided within a small space in the housing 83. This allows for a more compact design of the rotation sensing device 11.

(Position of Connecting Members in Axial Direction of Rotary Shaft)

As shown in FIG. 7, the three magnetic sensors 31-33 are disposed on the mounting face 46 of the substrate 45 such that their respective positions in the vertical direction of the magnetic wires 34 (in the axial direction of the rotary shaft 3) coincide with one another. In this condition, the vertical position of the first connecting member 41 of the middle magnetic sensor 32 among the three magnetic sensors 31-33 is different from the vertical positions of the first connecting members 41 of the magnetic sensors 31, 33 located at both ends among the three magnetic sensors 31-33. Specifically, the first connecting member 41 of the middle magnetic sensor 32 is located above the first connecting members 41 of the magnetic sensors 31, 33 located at both ends. On the other hand, the vertical positions of the first connecting members 41 of the two magnetic sensors 31, 33 located at both ends coincide with each other.

Positioning the first connecting member 41 of the magnetic sensor 32 above the first connecting members 41 of the magnetic sensors 31, 33 ensures an insulation distance (for example, 1 mm) between the first connecting members 41 of two adjacent magnetic sensors among the three magnetic sensors 31-33. Specifically, as shown in FIG. 7, the distance d between one end section 41A of the first connecting member 41 of the magnetic sensor 31 and one end section 41A of the first connecting member 41 of the magnetic sensor 32 is equal to or greater than the insulation distance. In addition, the distance between one end section 41A of the first connecting member 41 of the magnetic sensor 32 and one end section 41A of the first connecting member 41 of the magnetic sensor 33 is larger than distance d and is equal to or greater than the insulation distance.

In addition, as shown in FIG. 10, the distance e between the land 53, to which the other end section 41B of the first connecting member 41 of the magnetic sensor 31 is connected, and the land 53, to which the other end section 41B of the first connecting member 41 of the magnetic sensor 32 is connected, is equal to or greater than the insulation distance. In addition, the distance f between the land 53, to which the other end section 41B of the first connecting member 41 of the magnetic sensor 32 is connected, and the land 53, to which the other end section 41B of the first connecting member 41 of the magnetic sensor 33 is connected, is equal to or greater than the insulation distance. In addition, a screw 56 used to attach the magnetic sensing portion 30 to the mounting portion 80 of the holder 71 is inserted into a screw insertion hole 47 formed in an upper corner of the substrate 45, the screw 56 being electrically conductive. The distance g between the head 56A of this screw 56 and the land 53, to which the other end section 41B of the first connecting member 41 of the magnetic sensor 32 is connected, is equal to or greater than the insulation distance. In addition, the distance h between the head 56A of said screw 56 and the land 53, to which the other end section 41B of the first connecting member 41 of the magnetic sensor 33 is connected, is equal to or greater than the insulation distance.

In addition, the vertical position of the second connecting member 42 of the middle magnetic sensor 32 among the three magnetic sensors 31-33 is different from the vertical positions of the second connecting members 42 of the magnetic sensors 31, 33 located at both ends among the three magnetic sensors 31-33. Specifically, the second connecting member 42 of the middle magnetic sensor 32 is located below the second connecting members 42 of the magnetic sensors 31, 33 located at both ends. On the other hand, the vertical positions of the second connecting members 42 of the two magnetic sensors 31, 33 located at both ends coincide with each other.

Positioning the second connecting member 42 of the magnetic sensor 32 below the second connecting members 42 of the magnetic sensors 31, 33 ensures an insulation distance between the second connecting members 42 of two adjacent magnetic sensors among the three magnetic sensors 31-33. Namely, as shown in FIG. 7, the distance i between one end section 42A of the second connecting member 42 of the magnetic sensor 31 and one end section 42A of the second connecting member 42 of the magnetic sensor 32, and the distance between one end section 42A of the second connecting member 42 of the magnetic sensor 32 and one end section 42A of the second connecting member 42 of the magnetic sensor 33 are both equal to or greater than the insulation distance.

In addition, as shown in FIG. 10, the distance j between the land 53, to which the other end section 42B of the second connecting member 42 of the magnetic sensor 31 is connected, and the land 53, to which the other end section 42B of the second connecting member 42 of the magnetic sensor 32 is connected, is equal to or greater than the insulation distance. Further, the distance k between the land 53, to which the other end section 42B of the second connecting member 42 of the magnetic sensor 32 is connected, and the land 53, to which the other end section 42B of the second connecting member 42 of the magnetic sensor 33 is connected, is equal to or greater than the insulation distance. In addition, a screw 56 used to attach the magnetic sensing portion 30 to the mounting portion 79 of the holder 71 is inserted into a screw insertion hole 47 formed in a lower corner of the substrate 45, with the screw 56 being electrically conductive. The distance m between the head 56A of this screw 56 and the land 53, to which the other end section 42B of the second connecting member 42 of the magnetic sensor 31 is connected, is equal to or greater than the insulation distance. Further, the distance n between the head 56A of the screw 56 and the land 53, to which the other end section 42B of the second connecting member 42 of the magnetic sensor 32 is connected, is equal to or greater than the insulation distance. It should be noted that the distance between adjacent wiring lines 54 is also equal to or greater than the insulation distance.

Thus, in the rotation sensing device 11 according to the inventive embodiment, the spacing between two adjacent magnetic sensors on the mounting face 46 of the substrate 45 can be made extremely small while ensuring the insulation distance between the first connecting members 41 and the insulation distance between the second connecting members 42 of two adjacent magnetic sensors among the three magnetic sensors 31-33 by disposing the first connecting member 41 of the middle magnetic sensor 32 above the first connecting members 41 of the magnetic sensors 31, 33 located at both ends as well as disposing the second connecting member 42 of the middle magnetic sensor 32 below the second connecting members 42 of the magnetic sensors 31, 33 located at both ends. Therefore, the surface area of the mounting face 46 of the substrate 45, to which the three magnetic sensors 31-33 are mounted, can be reduced and the size of the substrate 45 can be made smaller. Accordingly, this makes it possible to reduce the dimensions of the rotation sensing device 11 and implement a rotation sensing device 11 that can be assembled into a compact electric motor 1.

In addition, in the two magnetic sensors 31, 33 located at both ends, the vertical positions of the first connecting members 41 coincide with each other and the vertical positions of the second connecting members 42 also coincide with each other. Therefore, two common magnetic sensors, i.e., two magnetic sensors, in which the geometry of the bobbin 36, as well as the disposition of the first connecting member 41 and the second connecting member 42, is the same, can be used as the two magnetic sensors 31, 33 disposed at both ends. This makes it possible to reduce tooling costs associated with the molding of the magnetic sensor bobbins, and to simplify the manufacture of the rotation sensing device 11, and so forth. It should be noted that, as can be seen from FIG. 7, in the present embodiment, magnetic sensor 33 is disposed such that its vertical orientation is reversed with respect to magnetic sensor 31.

(Operation of Rotation Sensing Device)

FIGS. 13(A) to 13(F) illustrate the operation of the rotation sensing device 11. Assuming that the angle of the rotary shaft 3 at the moment when the magnetic field forming portion 21 passes through the vicinity of the magnetic sensor 31 is 0 degrees, operation that takes place as the rotary shaft 3 rotates clockwise from 0 to 150 degrees is described below with reference to FIG. 13 as an example of operation of the rotation sensing device 11.

FIGS. 13(A) to 13(F) describes six states of the rotation sensing device 11. FIG. 13(A) shows a state in which the rotation angle of the rotary shaft 3 is 0 degrees, FIG. 13(B) shows a state in which the rotation angle of the rotary shaft 3 is 30 degrees, and FIG. 13(C) shows a state in which the rotation angle of the rotary shaft 3 is 60 degrees. Furthermore, FIG. 13(D) shows a state in which the rotation angle of the rotary shaft 3 is 90 degrees, FIG. 13(E) shows a state in which the rotation angle of the rotary shaft 3 is 120 degrees, and FIG. 13(F) shows a state in which the rotation angle of the rotary shaft 3 is 150 degrees. In addition, in FIG. 13, 51 shows a detection signal output from magnetic sensor 31, S2 shows a detection signal output from magnetic sensor 32, and S3 shows a detection signal output from magnetic sensor 33.

In FIG. 13(A), when the angle of the rotary shaft 3 is 0 degrees and the magnetic field forming portion 21 passes through the vicinity of magnetic sensor 31, a downwardly directed magnetic field formed by magnetic field forming portion 21 acts on the magnetic wire 34 of magnetic sensor 31. Assuming that, momentarily before this downwardly directed magnetic field acts on said magnetic wire 34 the direction of magnetization of said magnetic wire 34 is pointing up, when this downwardly directed magnetic field acts on said magnetic wire 34, the direction of magnetization of said magnetic wire 34 is instantaneously reversed from an upward direction to a downward direction as a result of a large Barkhausen effect. When the direction of magnetization of the magnetic wire 34 of magnetic sensor 31 is instantaneously reversed from an upward direction to a downward direction, within a brief time period, a large current is electromagnetically induced to flow through the coil 35 of magnetic sensor 31 and, for example, a positive-going pulse P1 is output from said coil 35.

Subsequently, when the rotary shaft 3 rotates clockwise and the angle of the rotary shaft 3 reaches 30 degrees, the magnetic field forming portion 21 passes through the vicinity of magnetic sensor 32. At such time, in accordance with the same principle as when the magnetic field forming portion 21 passed through the vicinity of magnetic sensor 31, the direction of magnetization of the magnetic wire 34 of magnetic sensor 32 is instantaneously reversed from an upward direction to a downward direction, and a positive-going pulse P2 is output from the coil 35 of magnetic sensor 32.

Subsequently, when the rotary shaft 3 rotates further clockwise and the angle of the rotary shaft 3 reaches 60 degrees, magnetic field forming portion 21 passes through the vicinity of magnetic sensor 33. At such time, in accordance with the same principle as when magnetic field forming portion 21 passed through the vicinity of magnetic sensor 31, the direction of magnetization of the magnetic wire 34 of magnetic sensor 33 is instantaneously reversed from an upward direction to a downward direction, and a positive-going pulse P3 is output from the coil 35 of magnetic sensor 33.

Subsequently, when the rotary shaft 3 rotates further clockwise and the angle of the rotary shaft 3 reaches 90 degrees, the magnetic field forming portion 22 passes through the vicinity of magnetic sensor 31 and an upwardly directed magnetic field formed by magnetic field forming portion 22 acts on the magnetic wire 34 of magnetic sensor 31. When this upwardly directed magnetic field acts on said magnetic wire 34, the direction of magnetization of said magnetic wire 34 is instantaneously reversed from a downward direction to an upward direction as a result of a large Barkhausen effect. When the direction of magnetization of the magnetic wire 34 of magnetic sensor 31 is instantaneously reversed from a downward direction to an upward direction, within a brief time period, a large current is electromagnetically induced to flow through the coil 35 of magnetic sensor 31 and a pulse P4 is output from said coil 35. In addition, the current flowing through the coil 35 when the direction of the magnetic field of the magnetic wire 34 is reversed from a downward direction to an upward direction in this manner becomes opposite in direction to the current flowing through the coil 35 when the direction of the magnetic field of the magnetic wire 34 is reversed from an upward direction to a downward direction. Therefore, if the direction of the pulse output from the coil 35 when the direction of the magnetic field of the magnetic wire 34 is reversed from an upward direction to a downward direction is a positive-going direction, then the direction of the pulse output from the coil 35 when the direction of the magnetic field of the magnetic wire 34 is reversed from a downward direction to an upward direction is a negative-going direction. Consequently, pulse P4 is a negative-going pulse.

Subsequently, when the rotary shaft 3 rotates clockwise and the angle of the rotary shaft 3 reaches 120 degrees, magnetic field forming portion 22 passes through the vicinity of magnetic sensor 32. At such time, in accordance with the same principle as when magnetic field forming portion 22 passed through the vicinity of magnetic sensor 31, the direction of magnetization of the magnetic wire 34 of magnetic sensor 32 is instantaneously reversed from a downward direction to an upward direction, and a negative-going pulse P5 is output from the coil 35 of magnetic sensor 32.

Subsequently, when the rotary shaft 3 rotates further clockwise and the angle of the rotary shaft 3 reaches 150 degrees, magnetic field forming portion 22 passes through the vicinity of magnetic sensor 33. At such time, in accordance with the same principle as when magnetic field forming portion 22 passed through the vicinity of magnetic sensor 31, the direction of magnetization of the magnetic wire 34 of magnetic sensor 33 is instantaneously reversed from a downward direction to an upward direction, and a negative-going pulse P6 is output from the coil 35 of magnetic sensor 33.

A detection signal S1 that comprises pulses P1, P4 output from the coil 35 of magnetic sensor 31, a detection signal S2 that comprises pulses P2, P5 output from the coil 35 of magnetic sensor 32, and a detection signal S3 that comprises pulses P3, P6 output from the coil 35 of magnetic sensor 33 are respectively input to the IC 52 provided on the rear face of the substrate 45. The IC 52 calculates the rotation angle or amount of rotation of the rotary shaft 3 based on the detection signals S1-S3 output from the respective magnetic sensors 31-33. For example, the method described in Patent Document 1 can be used as a method of calculation of the rotation angle or amount of rotation of the rotary shaft 3. It should be noted that, although not depicted in the drawings, the IC 52 is electrically connected to the drive control circuit of the electric motor 1 provided outside the rotation sensing device 11, and the IC 52 outputs a signal indicative of the rotation angle or amount of rotation of the rotary shaft 3 to the drive control circuit of the electric motor 1.

It should be noted that, in the embodiment described above, the insulation distance between the first connecting members 41 and the insulation distance between the second connecting members 42 of two adjacent magnetic sensors was ensured by disposing the first connecting member 41 of the middle magnetic sensor 32 above the first connecting members 41 of the magnetic sensors 31, 33 located at both ends, and by disposing the second connecting member 42 of the middle magnetic sensor 32 below the second connecting members 42 of the magnetic sensors 31, 33 located at both ends. However, the insulation distance between the first connecting members 41 and the insulation distance between the second connecting members 42 of two adjacent magnetic sensors may be ensured by disposing the first connecting member 41 of the middle magnetic sensor 32 below the first connecting members 41 of the magnetic sensors 31, 33 located at both ends, and by disposing the second connecting member 42 of the middle magnetic sensor 32 above the second connecting members 42 of the magnetic sensors 31, 33 located at both ends. In addition, the insulation distance between the first connecting members 41 and the insulation distance between the second connecting members 42 of two adjacent magnetic sensors may be ensured by disposing the first connecting member 41 and the second connecting member 42 of the middle magnetic sensor 32 above the first connecting member 41 and the second connecting member 42 of the magnetic sensor 31 located at one end, and by disposing the first connecting member 41 and the second connecting member 42 of the magnetic sensor 33 located at the other end above the first connecting member 41 and the second connecting member 42 of the middle magnetic sensor 32. Further, the insulation distance between the first connecting members 41 and the insulation distance between the second connecting members 42 of two adjacent magnetic sensors may be ensured by disposing the first connecting member 41 and the second connecting member 42 of the middle magnetic sensor 32 below the first connecting member 41 and the second connecting member 42 of the magnetic sensor 31 located at one end, and by disposing the first connecting member 41 and the second connecting member 42 of the magnetic sensor 33 located at the other end below the first connecting member 41 and the second connecting member 42 of the middle magnetic sensor 32.

In addition, in the embodiment described above, the distance between the magnetic wire installation portion 38 of the bobbin 36 of the middle magnetic sensor 32 and the mounting face 46 of the substrate 45 was made smaller than the distances between the magnetic wire installation portions 38 of the bobbins 36 of each of the magnetic sensors 31, 33 located at both ends and the mounting face 46, and the magnetic wire installation portions 38 of the bobbins 36 of each of the magnetic sensors 31, 33 positioned at both ends were made respectively equidistant from the mounting face 46. However, the relative magnitudes of the distances between the magnetic wire installation portions 38 of the three magnetic sensors 31-33 and the mounting face 46 are not limited to the ones described above. For example, if the magnetic sensing portion 30 is disposed on the outer periphery of the trackway of the four magnetic field forming portions 21-24 at a location different from FIG. 11, the distances between the magnetic wire installation portions 38 of the three magnetic sensors 31-33 and the mounting face 46 may be set to different values such that the magnetic wires 34 of the three magnetic sensors 31-33 become respectively equidistant from the axis X of the rotary shaft 3.

In addition, although the embodiment described above used an example in which the magnetic wire installation portions 38 were grooves formed in the wire winding portions 37, the magnetic wire installation portions may also be openings formed in the wire winding portions 37.

Further, although the embodiment described above used an example in which, as shown in FIG. 5, the four magnetic field forming portions 21-24 were made up of a ring magnet 25 having magnetic poles 25A-25D and a ring magnet 26 having magnetic poles 26A-26D, the method of forming the four magnetic field forming portions are not limited to the one described above. For example, the four magnetic field forming portions may be formed using a single-piece magnet having a total of 8 magnetic poles such as is illustrated in FIG. 5. In addition, the four magnetic field forming portions may be formed using four bar magnets having an N pole at one end and an S pole at the other end. Further, the four magnetic field forming portions may be formed using eight independent magnets.

In addition, while the external geometry of the wire winding portion 37 of the bobbin 36 of each magnetic sensor 31-33 in the embodiment described above had a cylindrical configuration with a transverse cross-section of a substantially elliptical shape, the external geometry of the wire winding portion 37 may have a cylindrical configuration with a transverse cross-section of a perfectly circular shape or a cylindrical-like configuration with a transverse cross-section of a polygonal shape.

In addition, the number of the magnetic sensors may be 4 or more. Further, the number of the magnetic field forming portions may be 2, 6, 8, or more. In addition, the rotary device is not limited to electric motors.

Further, an optical encoder used for optically sensing the rotation of the rotary shaft 3, or another rotation sensing device may be provided above the holder 71 of the rotation sensing device 11.

In addition, the present invention can be modified as appropriate where consistent with the essence or concept of the invention read from the claims and the description in its entirety, and magnetic sensing devices and rotation sensing devices featuring such modifications are also included within the technical concept of the present invention.

DESCRIPTION OF THE REFERENCE NUMERALS

1 Electric motor (rotary device)
2 Main body
3 Rotary shaft
4 Protruding portion
11 Rotation sensing device
21-24 Magnetic field forming portions
30 Magnetic sensing portion
31-33 Magnetic sensors
34 Magnetic wire
35 Coil
36 Bobbin
37 Wire winding portion
38 Magnetic wire installation portion
41 First connecting member
42 Second connecting member
45 Substrate
46 Mounting face
51 Electric circuit
71 Holder
83 Housing
84 Front wall panel
85 Rear wall panel
86 Left wall panel
87 Right wall panel

The invention claimed is:

1. A magnetic sensing device that senses magnetic fields in a rotation sensing device that comprises at least two magnetic field forming portions traveling about a periphery of a rotary shaft along with a rotation of the rotary shaft while respectively forming magnetic fields oriented in one direction and in an opposite direction along an axial direction of the rotary shaft, and that senses the rotation of the rotary shaft, wherein the magnetic sensing device comprises:
at least three magnetic sensors; and
a substrate having a mounting face for mounting the three magnetic sensors thereto;
wherein each of the at least three magnetic sensors comprises:
a magnetic wire generating Barkhausen effects,
a coil provided on an outer periphery of the magnetic wire, and
a bobbin having a wire winding portion whose external geometry is formed in a cylindrical configuration and around which an electrical wire of the coil is wound, and a magnetic wire installation portion, which is a space extending through the wire winding portion in the axial direction thereof and in which the magnetic wire is disposed;
wherein the three magnetic sensors are disposed on the mounting face such that the direction of extension of each respective magnetic wire is parallel to the mounting face; the three magnetic sensors and the substrate are disposed on an outer periphery of a trackway of the two magnetic field forming portions such that the direction of extension of the magnetic wire of each magnetic sensor is parallel to the axial direction of the rotary shaft; and, in each of the three magnetic sensors, a location of the magnetic wire installation portion in the bobbin is configured such that the respective magnetic wires of the three magnetic sensors are respectively equidistant from the rotary shaft.

2. The magnetic sensing device according to claim 1, wherein a distance between the magnetic wire installation portion of the bobbin of a middle magnetic sensor among the three magnetic sensors and the mounting face is smaller than distances between the magnetic wire installation portions of the bobbins of the magnetic sensors located at both ends among the three magnetic sensors and the mounting face.

3. The magnetic sensing device according to claim 1, wherein the magnetic wire installation portion in the bobbin of each magnetic sensor is a groove that is formed to run from a peripheral surface of the wire winding portion toward an interior of the wire winding portion and that extends through the wire winding portion in the axial direction thereof, and the groove formed in the wire winding portion of the bobbin of a middle magnetic sensor of the three magnetic sensors is deeper than the grooves formed in the wire winding portions of the bobbins of the magnetic sensors located at both ends among the three magnetic sensors.

4. The magnetic sensing device according to claim 1, wherein a cross-sectional shape of the coil of each magnetic sensor is a substantially elliptical shape whose major axis extends in a direction perpendicular to the mounting face.

5. The magnetic sensing device according to claim 1, wherein a cross-sectional shape of the wire winding portion of the bobbin of each magnetic sensor is a substantially elliptical shape whose major axis extends in a direction perpendicular to the mounting face.

6. A rotation sensing device that senses rotation of a rotary shaft, wherein
the rotation sensing device comprises:
at least two magnetic field forming portions traveling about a periphery of the rotary shaft along with the rotation of the rotary shaft while respectively forming magnetic fields oriented in one direction and in an opposite direction along an axial direction of the rotary shaft and
a magnetic sensing portion that senses the magnetic fields formed by the two magnetic field forming portions without moving along with the rotation of the rotary shaft;
the magnetic sensing portion comprises:
at least three magnetic sensors; and
a substrate having a mounting face for mounting the three magnetic sensors thereto;
wherein each of the three magnetic sensors comprises:
a magnetic wire generating Barkhausen effects,
a coil provided on an outer periphery of the magnetic wire, and
a bobbin having a wire winding portion whose external geometry is formed in a cylindrical configuration and around which an electrical wire of the coil is wound, and a magnetic wire installation portion, which is a space extending through the wire winding portion in the axial direction thereof and in which the magnetic wire is disposed;
wherein the three magnetic sensors are disposed on the mounting face such that the direction of extension of each respective magnetic wire is parallel to the mounting face; the magnetic sensing portion is disposed on an outer periphery of a trackway of the two magnetic field forming portions such that the direction of extension of the magnetic wire of each magnetic sensor is parallel to the axial direction of the rotary shaft; and, in each magnetic sensor, a location of the magnetic wire installation portion in the bobbin is configured such that the respective magnetic wires of the three magnetic sensors are respectively equidistant from the rotary shaft.

* * * * *